(12) United States Patent
Miyawaki et al.

(10) Patent No.: US 6,747,613 B2
(45) Date of Patent: Jun. 8, 2004

(54) VIDEO INFORMATION DISPLAY SYSTEM AND DISPLAY APPARATUS APPLICABLE TO THE SAME

(75) Inventors: Mamoru Miyawaki, Kanagawa-ken (JP); Tetsunobu Kochi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 09/777,669

(22) Filed: Feb. 7, 2001

(65) Prior Publication Data

US 2001/0040549 A1 Nov. 15, 2001

Related U.S. Application Data

(62) Division of application No. 08/403,942, filed on Mar. 14, 1995, now Pat. No. 6,232,947.

(30) Foreign Application Priority Data

Mar. 16, 1994 (JP) .............................................. 6-68976
May 17, 1994 (JP) ............................................. 6-102721

(51) Int. Cl.[7] .......................... G09G 5/00; H04N 5/74; H04N 9/31; G02F 1/00; G02F 1/1335; G03B 21/00; G03B 21/26
(52) U.S. Cl. .......................... 345/9; 345/1.1; 348/744; 348/751; 348/761; 349/5; 349/8; 353/31; 353/94
(58) Field of Search ................................ 345/330, 178, 345/2, 204, 1.1, 3.1, 7, 9; 348/751, 743, 744, 750–781; 359/41, 292, 456, 460; 340/702, 757; 353/30–33, 94, 122; 349/5–8

(56) References Cited

U.S. PATENT DOCUMENTS

| | | | |
|---|---|---|---|
| 3,893,758 A | 7/1975 | Hunzinger et al. | 353/20 |
| 4,127,322 A * | 11/1978 | Jacobson et al. | 353/31 |
| 4,426,407 A | 1/1984 | Morin et al. | 438/161 |
| 4,431,272 A | 2/1984 | Yazawa et al. | 349/113 |
| 4,635,051 A * | 1/1987 | Bos | 340/757 |
| 4,842,371 A | 6/1989 | Yasuda et al. | 345/96 |
| 4,846,694 A | 7/1989 | Erhardt | 434/365 |
| 4,904,061 A | 2/1990 | Aruga | 349/8 |
| 4,908,609 A | 3/1990 | Stroomer | 345/88 |
| 4,909,600 A * | 3/1990 | Ciarlei et al. | 350/317 |
| 5,012,274 A * | 4/1991 | Dolgoff | 340/702 |
| 5,132,821 A | 7/1992 | Nicholas | 349/43 |
| 5,191,450 A | 3/1993 | Yajima et al. | 359/54 |
| 5,260,815 A * | 11/1993 | Takizawa | 359/41 |

(List continued on next page.)

FOREIGN PATENT DOCUMENTS

| | | |
|---|---|---|
| EP | 0 541 295 | 5/1993 |
| GB | 2 204 980 | 11/1988 |
| JP | 54-139569 | 10/1979 |
| JP | 61-167297 | 7/1986 |
| WO | WO 94/01964 | 1/1994 |

OTHER PUBLICATIONS

"ISDN Audio–Graphics Teleconferencing Systems", Journal of Electronic Imaging, No. 4, pp. 285–295 (Oct. 1993).
Y. Takahashi, et al., "Multimedia Projecting Using 720×480 Pixel a–Si TFT–LCDs and a High–Speed Analogue Driver LSI", vol. 13, No. 1, pp. 5–10 (Jan. 1, 1992).

(List continued on next page.)

*Primary Examiner*—Amare Mengistu
*Assistant Examiner*—David L. Lewis
(74) *Attorney, Agent, or Firm*—Fitzpatrick, Cella, Harper & Scinto

(57) ABSTRACT

A display apparatus for displaying video information by superimposing a plurality of images obtained through a plurality of display systems, each including a light source, a reflection type liquid crystal panel and an optical system. The apparatus includes at least either of a system selector for selecting at least one of the plurality of display systems and a modifier for modifying the attributes of the image obtained through one of the display systems.

7 Claims, 26 Drawing Sheets

U.S. PATENT DOCUMENTS

| | | | |
|---|---|---|---|
| 5,264,953 A | | 11/1993 | Hirai et al. .................... 349/33 |
| 5,351,097 A | * | 9/1994 | Brooke ....................... 348/744 |
| 5,404,175 A | | 4/1995 | Nagae et al. ............... 348/751 |
| 5,422,693 A | | 6/1995 | Vogeley et al. ............. 345/158 |
| 5,450,079 A | | 9/1995 | Dunaway et al. ........... 345/169 |
| 5,473,393 A | | 12/1995 | Manabe ....................... 353/38 |
| 5,475,515 A | | 12/1995 | Yoshinaga et al. ............ 359/52 |
| 5,477,359 A | | 12/1995 | Okazaki ..................... 349/130 |
| 5,506,597 A | | 4/1996 | Thompson et al. ........... 345/85 |
| 5,508,713 A | | 4/1996 | Okouchi ........................ 345/1 |
| 5,523,802 A | * | 6/1996 | Sugihara et al. ............ 348/743 |
| 5,540,858 A | | 7/1996 | Yoshinaga et al. .......... 359/104 |
| 5,552,840 A | * | 9/1996 | Ishii et al. .................. 348/751 |
| 5,555,041 A | | 9/1996 | Manabe ....................... 353/98 |
| 5,568,279 A | | 10/1996 | Hinman et al. ............. 358/452 |
| 5,614,732 A | | 3/1997 | Yamazaki .................... 257/66 |
| 5,652,672 A | * | 7/1997 | Huignard et al. ........... 359/292 |
| 5,745,093 A | | 4/1998 | Tsuzuki et al. ............. 345/103 |
| 5,745,711 A | | 4/1998 | Kitahara et al. ............ 345/330 |
| 5,940,049 A | * | 8/1999 | Hinman et al. ................ 345/2 |
| 6,008,804 A | * | 12/1999 | Pommier et al. ........... 345/330 |
| 6,141,000 A | * | 10/2000 | Martin ....................... 345/178 |
| 6,237,025 B1 | * | 5/2001 | Ludwig et al. ............. 709/204 |

OTHER PUBLICATIONS

Dr. H. Suefert, "GroBbild–Projektion in der Leittechnik fordert Mensch–Mensch–Kommunikation", Electronic, vol. 41, No. 20, pp. 60–65 (Sep. 29, 1992).

R. Gerhard–Multhaupt, "Light–Valve Technologies for High–Definition Television Projection Displays", Displays, vol. 12, No. 3/04, pp. 115–128 (Jul. 1, 1991).

R. Gerhard–Multhaupt, "Evolution De La Technologie Des Modulateurs De Lumiere Pour La TVHD", International Colloquium on Advanced Television Systems . . . , No. Colloquium 4, pp. 2B.5.1–2B.5.15 (Jun. 25, 1990).

D.J. McKnight, et al., "Electrically Addressed 256 by 256 Liquid–Crystal–On–Silicon Spatial Light Modulator", Optics Letter, vol. 18, No. 24, pp. 2159–2161 (Dec. 15, 1993).

* cited by examiner

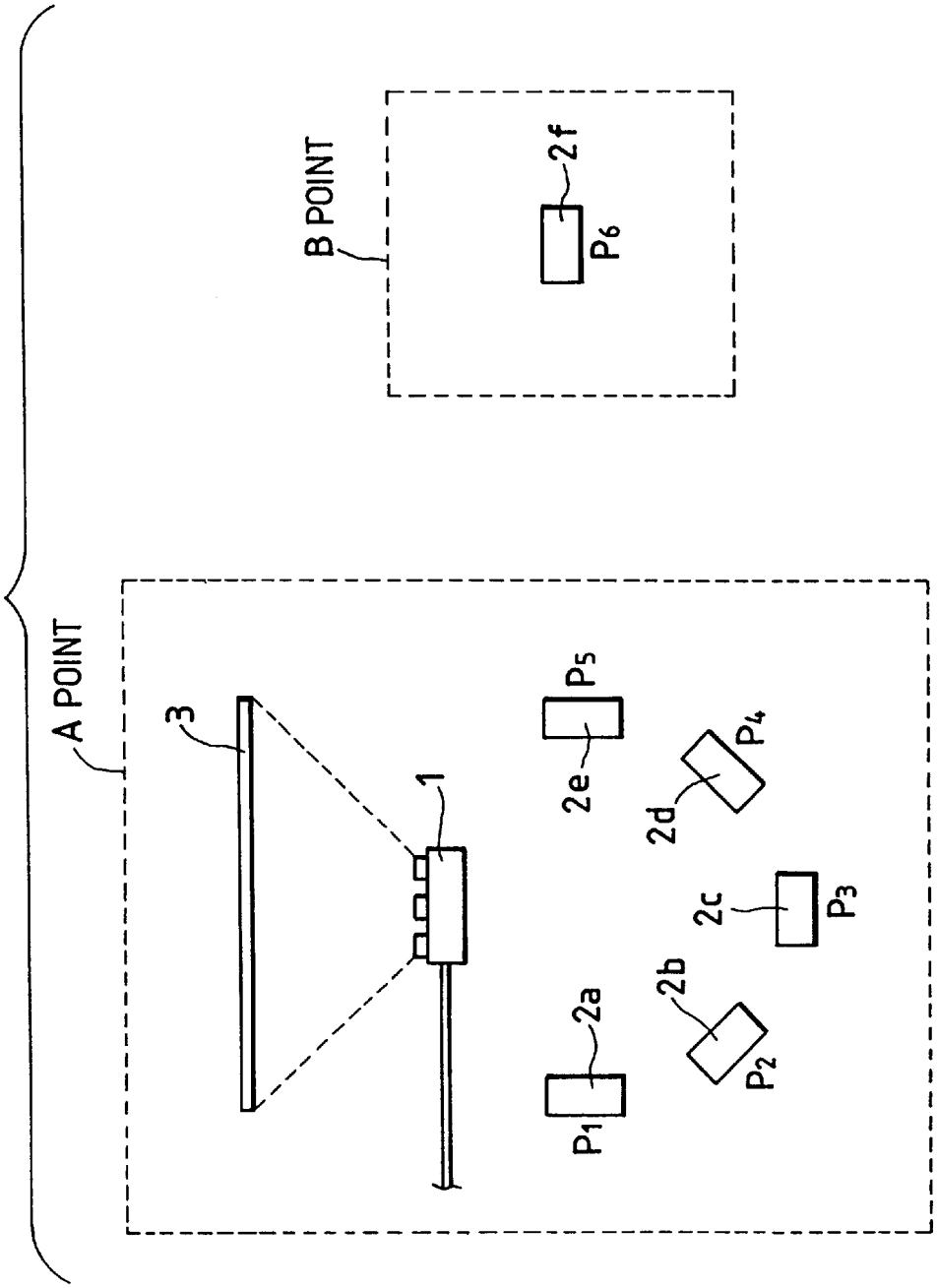

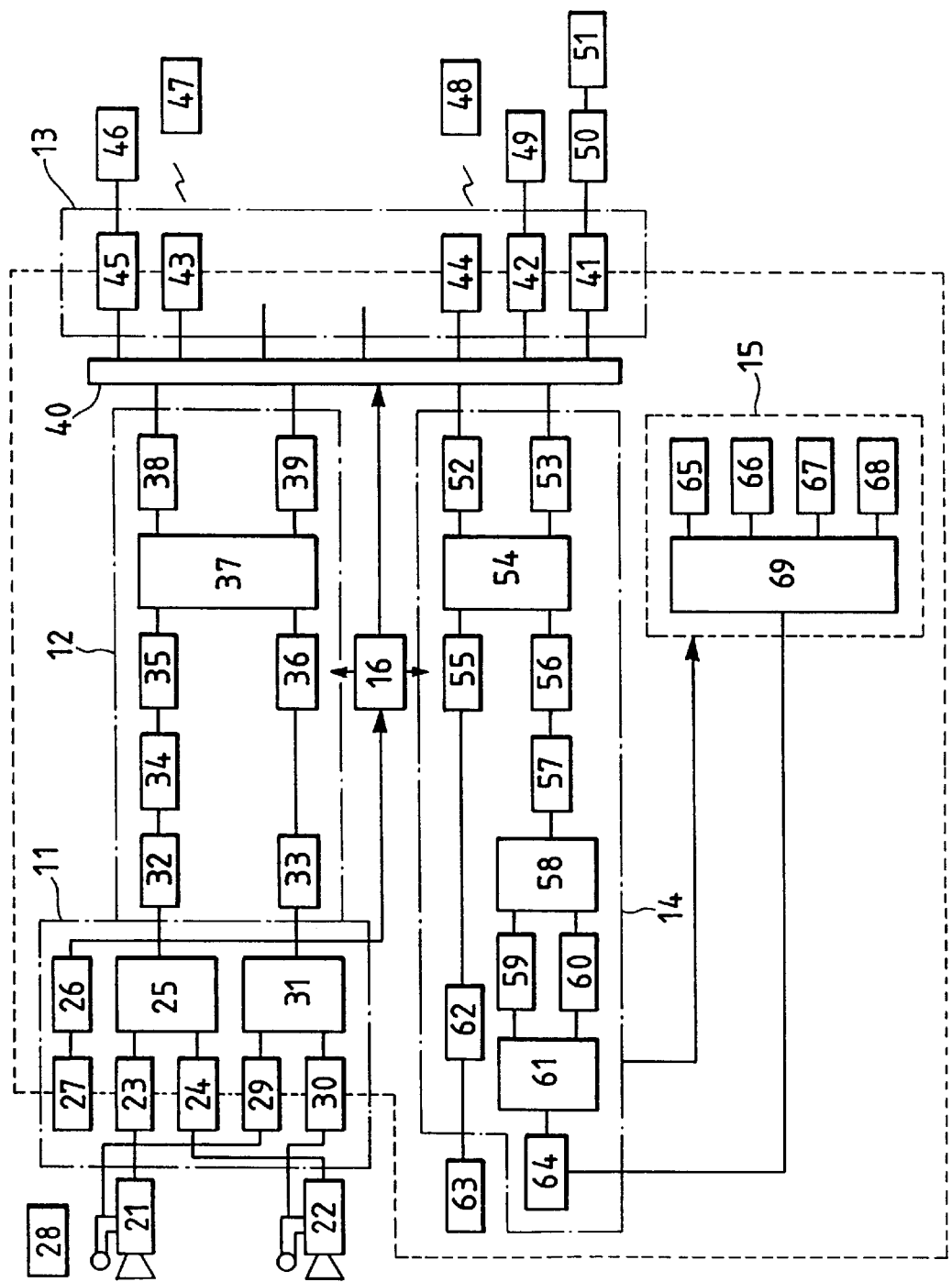

VIDEO INFORMATION DISPLAY SYSTEM AND DISPLAY APPARATUS APPLICABLE TO THE SAME

This application is a divisional of application Ser. No. 08/403,942, filed on Mar. 14, 1995 now U.S. Pat. No. 6,232,947.

BACKGROUND OF THE INVENTION

1. Field of the Invention

This invention relates to a display apparatus for displaying characters, still images, moving images and other forms of information and it also relates to a video information display system for which such an apparatus can be suitably used.

2. Related Background Art

In recent years, a variety of handy apparatus adapted for use in multimedia environment have been developed and commercialized. Portable terminals and lap-top computers are among them. These apparatus can be used to retrieve information at locations other than offices and are also provided with capabilities of processing and transmitting information.

However, such apparatus are mostly designed for personal use and not adapted for teleconferences where a large number of attendants discuss subject matters in multimedia environment on the basis of commonly shared visual pieces of information. Thus, despite the development of such apparatus, people are forced to physically travel over a long distance at the cost of productivity in order to attend a meeting to be held at a single location.

Proposals have been made to "electronize" conferences and realize video conference systems. However, such systems are mostly designed for teleconferences attended by people stationed at different remote locations, where attendants can see each other and look at displayed data but cannot write-in and/or otherwise process data to update the information they have. Probably, this is mainly because no technology is currently available to instantly display updated information with a level of resolution and brightness comparable to that of the overhead projector (OHP) at a reasonable cost. Meanwhile, with a currently known visual telephone system, although two parties located at the opposite ends of the line can look at and talk to each other, neither of them can access the source of information possessed by the other party in order to write, erase and/or otherwise process data for the other party.

As for a projection type display apparatus, Japanese Patent Application Laid-open No. 54-139569 discloses a display apparatus comprising a light valve and a schlieren optical system for projecting an image as the light valve receives light. It additionally comprises a liquid crystal layer that produces a spheric and periodic structure that diffracts the flux of light directed to the light valve when a voltage is applied to the layer.

The above apparatus operates satisfactorily in terms of diffraction effect so long as the light valve is sufficiently large and a high degree of resolution is not required for it and, at the same time, the cell size of each pixel is large. To the contrary, however, when the light valve is relatively small and required to show an enhanced degree of resolution and still the cell size of each pixel is as small as tens of several micrometers, the diffracting zone is made extremely narrow and no sufficient amount of diffracted light becomes available to remarkably lower the level of brightness and contrast.

Japanese Patent Application Laid-open No. 61-167297 discloses a display apparatus comprising a plurality of liquid crystal panels arranged to a multilayer structure in order to display bright images on the screen. However, the apparatus is still unsatisfactory in terms of the absolute brightness of the displayed images mainly because three primary colors are overlaid one on the other for displaying color images.

SUMMARY OF THE INVENTION

Therefore, it is an object of the present invention to provide a video information display system that can be suitably used for a video conference system and with which the attendants of the video conference may access to and share common sources of information.

Another object of the invention is to provide a display apparatus that can be suitably used for such a system.

Still another object of the invention is to provide a video display apparatus that can display images with a level of resolution and brightness comparable to that of an OHP and that can be manufactured at reasonable cost.

A further object of the invention is to provide a video display apparatus comprising a large and high definition display screen and capable of simultaneously displaying different visual pieces of information from a plurality of different sources selectively in color or in black and white on a divided screen such that each visual piece of information may be dimensionally enlarged or reduced at will within the display screen.

According to a first aspect of the invention, the above objects are achieved by providing a video information display system for receiving data for video information entered from a plurality of sources and displaying the video information after synthetically combining and/or editing the data, characterized in that said system comprises means for synthetically combining and/or editing data according to control signals from the sources of video information, first video information display means for displaying on the side of the plurality of the sources the video information and second video information display means to be placed at a location different from that of the first video information displaying means for displaying video information obtained by synthetically combining and/or editing data.

According to a second aspect of the invention, there is provided a display apparatus for displaying video information by superimposing a plurality of images obtained through a plurality of display systems, each being constituted by a light source, a reflection type liquid crystal panel and an optical system, characterized in that said apparatus comprises at least either of system selection means for selecting at least one of the plurality of display systems, and modification means for modifying the attributes of the image obtained through said at least one of the display systems.

With a video information display system and a display apparatus according to the invention, attendants of a conference can share sources of information and process information stored there.

With a video information display system and a display apparatus according to the invention, attendants of a teleconference including those located in remote areas can share sources of information and process information stored there by writing and other processing means to successfully hold the conference.

A display apparatus according to the invention can display images in black and white or in color or in both black and white and in color at the user's will and the user of the apparatus can use it to exchange data with terminals of other information systems and process data. Thus, the attendants of a conference where a display apparatus according to the invention is used can freely share sources of information to improve the efficiency of the conference. Additionally, since a display apparatus according to the invention is compact and can be manufactured at low cost, it provides a convenience for office environment.

In a display apparatus according to the invention, means for modifying the attributes of an image comprises means for changing the color or colors of the image, means for changing the size of the image and means for changing the brightness of the image.

With a display apparatus according to the invention, one of a plurality of display systems may be used for displaying an image in black and white while the remaining systems are used for displaying images in different colors. These images may be superimposed on each other on a single display screen so that one or more than one images may be displayed in black and white while the remaining images are displayed in different colors simultaneously.

The color filters arranged on the light paths of the color display systems can be operated either in set or non-set mode so that they may also be used to display images in black and white. If they are used for displaying images both in color and in black and white simultaneously, the display systems for displaying images in black and white are made to generate black and white image signals including a black signal for reserving an area on the display screen for color images, whereas the display systems for displaying images in color are made to generate color image signals including a black signal for reserving an area on the display screen for black and white images.

For the purpose of the present invention, the area for black and white images or the area for color images of the display screen may be selectively illuminated by rays of light from the light source by means of a liquid crystal panel or by some other means in order to ameliorate the quality of the image.

In a display apparatus according to the invention, the optical system of each display system may comprise a schlieren optical system. Additionally, it may comprise a panel provided with a mirror and a pinhole arranged on the focal point of the lens disposed on the liquid crystal panel of the system. The liquid crystal panel may preferably be of polymer type. Preferably, the liquid crystal panel is provided with an anti-reflection film on the surface of the transparent substrate for receiving incoming flux of light from the light source and on the rear side of the liquid crystal panel in order to reduce noise.

If the optical axis of the optical system of a display apparatus according to the invention is inclined relative to the surface of the display screen for displaying projected images and if, when measured along the optical axis of the aggregate optical system, the largest distance between the display screen and the exit pupil is b2 and the smallest distance between the display screen and the exit pupil is b1 while the largest distance between the liquid crystal panel and the entrance pupil of the optical system is a1 and the smallest distance between the liquid crystal panel and the entrance pupil of the optical system is a2, an agreeable image free from distortions and blurs can be obtained on the display screen by minimizing the difference between b1/a1 and b2/a2.

A display apparatus according to the invention can be down-sized and manufactured at low cost by using polycrystalline Si thin film transistors for the pixel section of the liquid crystal panel and bulk Si transistors for the peripheral circuits.

A display apparatus according to the invention preferably comprises means for transmitting data for video information to information terminals and an image processing circuit section provided with memories and means for compressing, expanding, encoding and decoding data. Preferably, video signals for an odd row of pixels and for an adjacent even row of pixels are transmitted simultaneously to the liquid crystal panel from the image processing circuit section and a drive line is arranged between each pair of an odd row and an even row and signal lines for odd rows and those for even rows are alternately arranged.

For a display apparatus according to the invention, wireless interfaces may advantageously be provided.

BRIEF DESCRIPTION OF THE DRAWINGS

FIG. 1 is a schematic diagram of a video information display system comprising a display apparatus also according to the invention.

FIG. 2 is a block diagram of an embodiment of a video information display system comprising a display apparatus also according to the invention.

DETAILED DESCRIPTION OF THE PREFERRED EMBODIMENTS

Figure 3A:
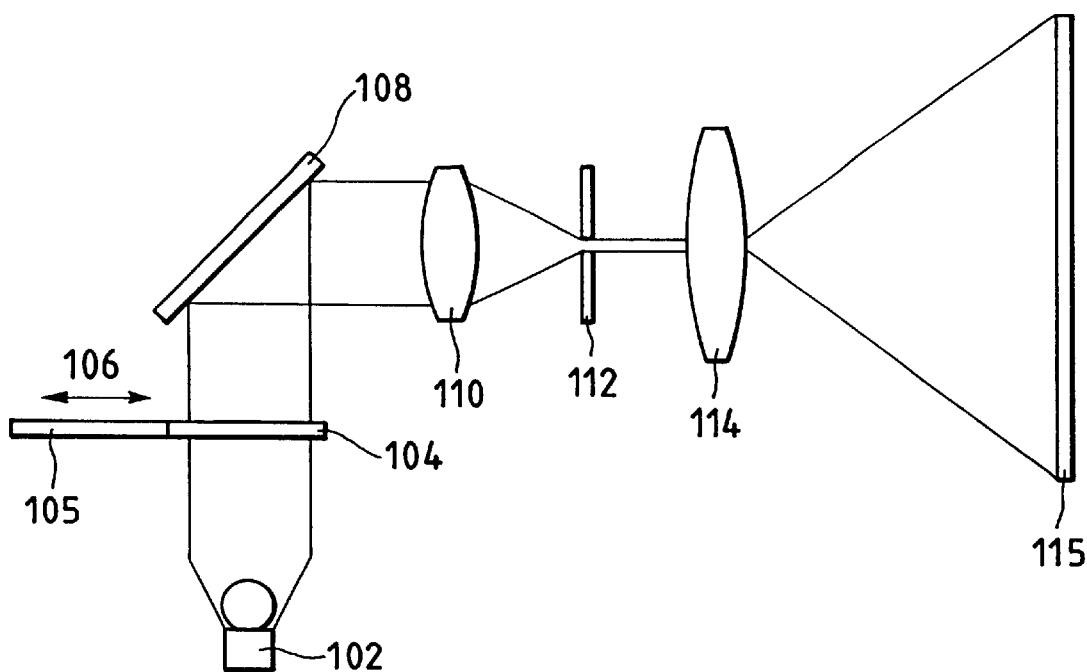
FIGS. 3A and 3B are schematic diagrams of optical systems of a display apparatus according to the invention.

Now, the present invention will be described in greater detail by referring to the accompanying drawings that illustrate preferred embodiments of the invention.

[Embodiment 1]

FIG. 1 is a schematic diagram of a video information display system comprising a display apparatus according to the invention.

Referring to FIG. 1, the video information display system comprises a display apparatus 1 according to the invention and installed at location A, where a meeting is being held by persons P1 through P5 having their respective personal computers 2a through 2e that store respective data and are provided with a light pen for data input operations. At remote location B (that can be an overseas location), person P6 also attends the meeting, carrying a similar personal computer 2f, and can access the display apparatus 1 through the computer and probably a submarine cable network. Note that the computers 2a, 2e and 2f of FIG. 1 respectively corresponds to computers 47, 48 and 51 of FIG. 2 as will be described hereinafter.

Assume now that person P1 is displaying data stored in computer 2a on the display screen 3 of the display apparatus 1 in black and white and person P5 is trying to add certain data to those displayed on the display screen 1 by writing them in red on the display screen of his or her own computer 2e. By doing this, those added data are also displayed on the display screens of the computers 2a through 2f. In other words, the attendants of the meeting can commonly share data as they are displayed on the screen of the display apparatus from the computers 2a through 2f and can update the displayed data by additionally writing and/or erasing data and editing them in appropriate ways. The image on the display screen 3 is identical with the one displayed on the screen of each of the computers. The persons P1 through P2 can use different colors assigned to them, such as red and green, for writing and editing data and the operations of displaying and editing data can be remotely controlled by means of a remote control unit as shown in FIG. 2.

With a video information display system configured as described above, the persons P1 through P5 can share visual data in an effective and efficient manner by way of their respective personal computers 2a through 2e and, at the same time, by watching the large display screen 3 of the display apparatus, while maintaining a warm atmosphere because they can see each other and communicate with each other in a nonverbal way as well.

FIG. 2 is a block diagram of an embodiment of a video information display system comprising a display apparatus according to the invention.

This embodiment can be roughly divided into six major blocks. They are an analog system input interface 11, an analog data encoding section 12, a digital system input interface 13, a decoding/image synthesizing and processing section 14, a display section 15, a CPU 16 for controlling operations of the system as a whole such as initialization of the system and exchanges of data with external apparatus and supervising tasks of the system components such as those being carried out by the encoding section, the decoding section and the display section.

The analog system interface 11 comprises video interfaces 23 and 24 for transferring video data from cameras 21 and 22 to input video signal processing section 25 and audio interfaces 29 and 30 for transferring audio data from microphones of the cameras 21 and 22 to input audio signal processing section 31.

Reference numeral 28 denotes a remote control unit while reference numeral 27 denotes a remote control interface, which can be an infrared rays detector, and reference numeral 26 denotes a system controller of the analog system interface. The remote control unit 28 is used to operate the display apparatus and the entire operation of the apparatus can be controlled by means of the control unit. It is connected to the CPU 16 wirelessly. Thus, the data (including analog data and digital data) to be displayed on the display screen of the display apparatus and the colors for displaying the data can be selected via the control unit, which can also be used to control the luminance of the display screen as well as the cameras and the microphones.

The signal processing sections 25 and 26 select a plurality of data and transmit them to respective A/D converters in the analog data encoding section 12 so that video data and audio data are processed independently and may be appropriately combined for synthesis and other effects.

The analog data encoding section 12 comprises A/D converters 32 and 33 and a signal format converter 34 for converting, for example, NTSC signals into CIF signals and HDTV signals into NTSC signals. It also comprises a compressor/encoder 35 for converting the format of signals, for example, from the NTSC format into the CIF format and encoding them according to the H261 system as specified in CCITT as a standard system or the MPEG system. Similarly, audio signals are encoded according to the G722 system by a compressor/encoder 36. Encoded signals are then transferred to external buffers 38 and 39 via a data multiplexing block 37 on a word by word basis.

Now, the digital system interface 13 will be described below.

The digital system interface 13 comprises a communication interface 41, a storage device interface 42, optical communication interfaces 43 and 44 for connecting information terminals for optical communication and an interface 45 for connecting control terminals. The communication interface 41 is designed for N-ISDN, B-ISDN and/or Ethernet while the storage device interface 42 is designed for prevalent SCSI. Each of the optical communication interfaces 43 and 44 and the interface 45 for connecting control terminals comprises two components, one for control and the other for data transfer. The interfaces are transputer link interfaces capable of transferring data at a rate of as high as 1.8M bytes/sec. With this arrangement, coded data can be transferred among the encoding section 12, the decoding section 14 and the various terminals of the system.

The interface 45 is connected to a personal computer or a work station 46 and the interface 43 is connected to a personal computer 47 provided with a light pen for data input operations, whereas the interface 44, the interface 42 and the communication interface 41 are respectively connected to a personal computer 48, a memory disc 49 such as a CD-ROM or an opto-magnetic disc and a submarine cable network 50 and then to a personal computer 51.

The decoding/image synthesizing and processing section 14 takes in encoded data transmitted from external buffers 52 and 53 on a word by word basis through a bus 40. It comprises a data separating block 54 that separates data into video data and audio data along with an expander 55 and a decoder 56 for expanding and decoding data respectively. Video data are sent further forward by way of a format converter 57 and a bus 58 for frame memories and video data that provides basic data for displaying images is stored in output frame memories a 59 while video data to be combined with those of the memories a 59 for synthetic effects are stored in output frame memories b 60. The memory size of the memories may be typically 1024(H)×521(V)8 bit/pixel for luminance signals and 512(H)×512(V)8 bit/pixel for color difference signals R-Y and B-Y.

The system can selectively display data in black and white or in color. The decoding/image synthesizing and processing section 14 further comprises an image synthesizing circuit 61 that outputs only the data stored in the output frame memories a 59 if no data are stored in the output frame memories b 60 and combines the data in the output frame memories a 59 and those in the output frame memories b 60 if the latter also stores data so that both luminance Y signals and RGB component signals may be used for color display. If, for example, data supplied by personal computer 48 are to be displayed on the screen of the display apparatus, they are firstly stored in the frame memories a 59, which by turn send out a luminance signal for the data. If additional data are written on the above data from personal computer 47, the added data are stored in the frame memories b 60, which by turn send out a combined RGB component signal for the added data. Both audio and video signals are sent out as analog signals via respective D/A converters 62 and 64. Then, audio signals are forward to a loudspeaker 63, whereas video signals are sent to display section 15.

The display section 15 comprises a display apparatus according to the invention and by turn comprising a number of projection type liquid crystal displays arranged to form a multilayer structure. In this embodiment, the display apparatus comprises a displays 65, 66, 67 and 68 for displaying data in black and white, in red or black and white, in green or black and white and in blue or black and white respectively.

For displaying data in black and white, the color filters of all the displays 66 through 68 are switched to black and white display mode so that the displays cooperatively display data in black and white. For writing additional data in color onto the screen that is displaying data in black and white, only the display 65 operates for displaying data in black and white, while displays 66 through 68 are used for displaying data in color.

If, for example, only red of the primary colors of red, green and blue is used for color display, the display 66 is used for displaying data in red, while all the remaining displays are used for displaying data in black and white.

The displays are driven to operate by a liquid crystal display device (LCD) drive system 69 and their operations are controlled by the CPU 16 via the image synthesizing circuit 69. If data are displayed in black and white and in red and the data in black and white are rather too bright to over-shadow the data in red, the operation of displaying data in black and white may be carried out only by the display 65 whereas rotary type filters may be used for the remaining displays 66 through 68 and operated in color display mode to cause the displays 66 through 68 to show data in red with a level of luminance that matches the level of luminance of the data in black and white.

While all combined data are collectively sent to the LCD drive system in this embodiment, it may be understood that it may alternatively be so designed that luminance signals are directly sent to display 65 for displaying data in black and white whereas RGB component signals are transmitted to respective R, G and B displays.

Most data used in offices may well be displayed in black and white although they may have to be shown in a finely defined state. Conventional color display apparatus are apt to lose more than two thirds of the amount of light available to them because of a high absorption rate of the color filters installed therein. Differently stated, such apparatus have to consume light at an enhanced rate to clearly and properly display data in color. Otherwise, they can be used only for displaying data in black and white.

Contrary to this, a display apparatus according to the invention can clearly and properly display data either in black and white or in color without using any additional source of light. It can be used to display images in standard color display mode by using the component displays for their respective proper operations of displaying images in red, green and blue.

While the display apparatus of FIG. 2 comprises four displays to be used in different combinations, it may alternatively be so designed as to comprise three pairs of displays for combinations of red and black and white, green and black and white and blue and black and white. Still alternatively, a plurality of sets of displays for red, green, blue and black and white may appropriately be used.

The display apparatus of the above embodiment has a characteristic feature that data can be displayed in a finely defined state if they are characters and the like that do not particularly require gradation. Another feature of the apparatus is that sources of images are separated from cameras and personal computers and images may be transmitted through wireless channels as in the case of FIG. 1.

The display apparatus of the above embodiment can display bright and finely defined images if compared with conventional apparatuses. This means that the hall, for instance, where it is installed do not need to be blacked out unlike the case of using an OHP so that the attendants can freely read documents and see each other.

While a display apparatus comprising a plurality of sets of displays may conventionally be realized only at prohibitive cost, a display apparatus according to the invention and having a similar configuration will cost only reasonably because it utilizes optical systems designed with emphasis on cost reduction. This will be described further by referring to FIGS. 3A and 3B.

Figure 3B:
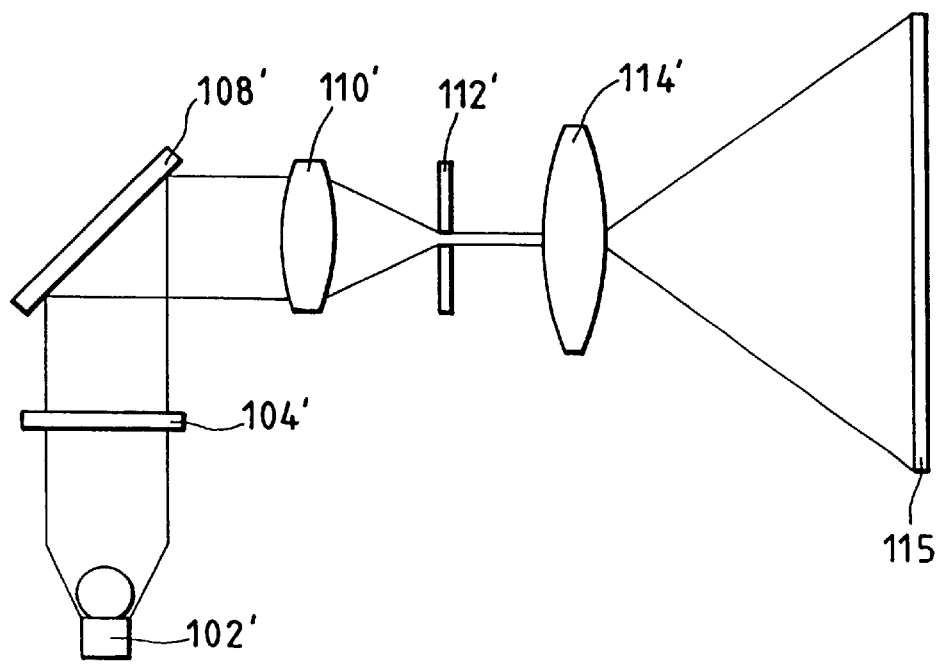

FIGS. 3A and 3B illustrate the optical systems comprised in the display apparatus of the above embodiment. FIG. 3A shows an optical system for producing color images while FIG. 3B shows an optical system for forming black and white images. Note that more than two such systems can be arranged to produce images that are superimposed on a single display screen 115 shown in FIGS. 3A and 3B.

Referring to FIGS. 3A and 3B, the systems comprise respective reflector panels 102, 102' for collimating rays of light emitted from respective light sources, which may be metal halide lamps or halogen lamps that are as small as 1 mm in diameter. In comparable conventional apparatus, light sources are so designed as to consume power at a rate as high as 300 to 400 W in order to produce bright images and such light sources can be as large as 5 to 6 mm or, in some cases, 10 mm in diameter and emit light so intensely that emitted light may be caused to unintentionally transmit glass panels arranged in adjacent areas to blur the fluxes of light coming directly from the light sources and further reduce the efficiency with which they operate. The service life of such power consuming light sources will inevitably be short.

Additionally, the power source of conventional apparatus that is required to supply power at a rate of 300 to 400 W is also inevitably large and heavy, making the apparatus not portable. To the contrary, the power sources comprised in the display apparatus of the above embodiment are as small as 1 mm in diameter and consume power at a rate equal to a fraction of the power consumption rate of conventional apparatus. Therefore they are free from the problems accompanying their counterparts of conventional apparatus such as light unintentionally transmitted through glass panels arranged in adjacent areas. Consequently, rays of light from the light sources are effectively and efficiently collimated before they strike the LCD panel.

The optical display systems of the display apparatus of the above embodiment also comprises respective IR (infrared rays) cut filters 104, 104' for blocking undesired rays of radiation that can otherwise strike the LCD panel and preventing the LCD panel from being heated by such rays of radiation. The color filters 105 of the system are monochromatic filters of red, green and blue that can be produced at low cost because they are not of so-called "on-chip" type.

While FIGS. 3A and 3B show sliding type filters and, while the IR cut filter 104 and any of the color filter 105 may be switched for use by sliding them along arrow 106 in FIG. 3A, they are be replaced by rotary type filters that may be used at the same time.

The rays of light transmitted through the IR cut filter 104 or one of the color filters 105 of each of the system are made to scantly strike and be reflected by the liquid crystal panel 108 or 108', which are of scattering-non scattering type, preferably of polymer dispersion type, as will be described in detail hereinafter.

As seen from FIGS. 3A and 3B, each of the liquid crystal panels is arranged at a position where a mirror is located in an ordinary optical display system. In other words, the display apparatus of the above embodiment has a fewer number of optical components to reduce the manufacturing cost and increase the efficiency of utilization of light probably by several percentage points.

The optical systems comprise respective schlieren optical systems constituted respectively by lenses 110 and 110' and pin holes 112 and 112'. So long as no voltage is applied to the liquid crystal panels 108, 108', the liquid crystal of the panels is in a random state to scatter light so that no light actually passes through the pin holes 112, 112'. As a voltage is incrementally applied to the liquid crystal panels (an inverted voltage is applied to prevent ion burning from taking place), liquid crystal molecules are oriented in a single direction to reduce scattering light and collimated rays of light are forced out through the pin holes 112, 112' and form images on the display screen 115 by respective projection lenses 114, 114'. The quality of the formed images can be improved by adjusting the angular positions of the inclined liquid crystal panels 108, 108' and/or arranging a prism in each of the optical systems.

While the optical systems of FIGS. 3A and 3B for color and black and white comprise light sources for different colors and black and white, sets of lenses and other components, a single light source may alternatively be used for three colors of red, green and blue. If such is the case, the light from the single light source is decomposed into red, green and blue lights, which are then made to strike the liquid crystal panel separately to form different images on the screen, which may or may not be combined together before projected onto the display screen.

It will be understood from the above description that the optical systems of the display apparatus of the present embodiment comprises a reduced number of components as compared with those of a conventional apparatus to improve the efficiency of utilization of light and the manufacturing cost. Additionally, with such systems, the display apparatus can be significantly downsized.

The projection panels, or mirrors, of the optical systems of comparable known display apparatus are typically dimensioned to be about 3 inches by 5 inches, making the optical systems inevitably large and costly. To the contrary, the projection panels, or liquid crystal panels, of the optical systems of a display apparatus according to the invention has a surface area that is only a fraction of that of the mirrors of conventional display apparatus and the effective area of the apertures of the panels can be proportionally downsized so that the cost and the weight of the related optical components can be reduced by the third power thereof. Thus, the cost and the weight of a display apparatus according to the invention and comprising a plurality of such optical systems would not significantly rise.

Figure 4:
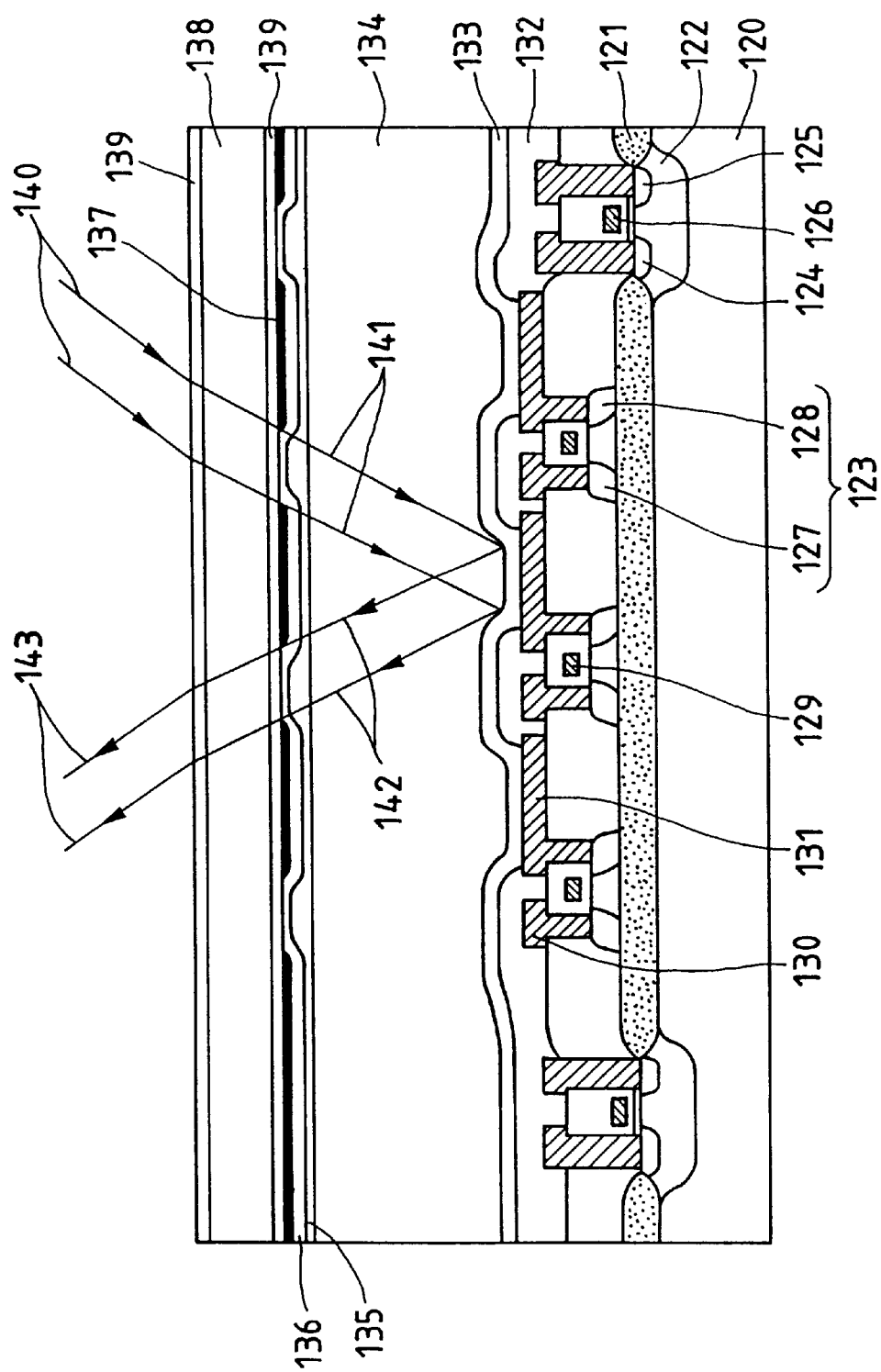
FIG. 4 is a schematic lateral sectional view of a liquid crystal panel that can be used for a display apparatus according to the invention.

FIG. 4 is a schematic lateral sectional view of a liquid-crystal panel that can be used for a display apparatus according to the invention. In the liquid crystal panel 108 of FIG. 4, there are shown for each bulk Si transistor for driving the LCD panel, an Si substrate 120, a field oxide film 121, a well layer 122, a polycrystalline Si layer 123 for forming a thin film transistor (TFT) in the pixel section, a source 124, a drain 125, a gate 126, a source 127 and a drain 128 comprised in the polycrystalline Si layer 123 of the pixel section TFT, a gate 129 of the pixel section TFT, a wiring layer to be used for signal lines and connected with the source of the pixel section TFT, a reflection electrode 131 of the pixel section TFT, a passivation film 132, oriented films 133 and 135, polymer dispersion liquid crystal 134, a transparent electrode 136, a non-reflection type screening layer 137, a glass plate 138 operating as an opposite substrate and an anti-reflection film 139.

The oriented films may be omitted when polymer dispersion liquid crystal is used, although they can modify the orientation of the panel to eliminate rays of scattered light directed along reflected light to improve the extinction ratio. The screen layer 137 can also be omitted depending on the angle of incidence of incoming light and its scattering components.

A voltage is applied to the liquid crystal layer 134 of the liquid crystal panel via the transparent electrode 136 and the reflection electrode 131. Parallel rays 140 of light arriving the panel from the side of the opposite substrate enter the liquid crystal layer 134 as a flux of light indicated by arrows 141 without being reflected by the surface of the liquid crystal layer because of the existence of the anti-reflection film 139. The flux of light 141 is then reflected by the reflection electrode 131 as indicated by arrows 142 and goes out of the liquid crystal panel into the direction indicated by arrows 143.

As seen from FIG. 4, since the components of light reflected by the surface of the opposite substrate and other surfaces are suppressed by the anti-reflection film 139, they would not be added to the light reflected within the liquid crystal layer 134. Additionally, since polycrystalline Si TFTs having a small film thickness between 200 and 500 Å are used for the pixel section, no stepped areas are formed within the pixel section. Finally, since peripheral circuits are made of bulk monocrystalline Si, the liquid crystal is driven at high speed to display finely defined images by using hundreds of several thousands to several million pixels.

The technique of driving the liquid crystal panels of the above embodiment will be described by referring to the equivalent circuit diagram of FIG. 5. The circuit of FIG. 5 comprises horizontal shift registers 201 and 202, a vertical shift register 203, video signal lines 204 and 205, sampling transistors for sampling video signals according to the scanning pulses transmitted from the horizontal shift registers, signal lines 208 and 209, drive lines 210, pixel section TFTs 213, a power source for applying a voltage to one of the electrodes of each addition capacitance of the circuit and additional capacitances 220.

Figure 5:
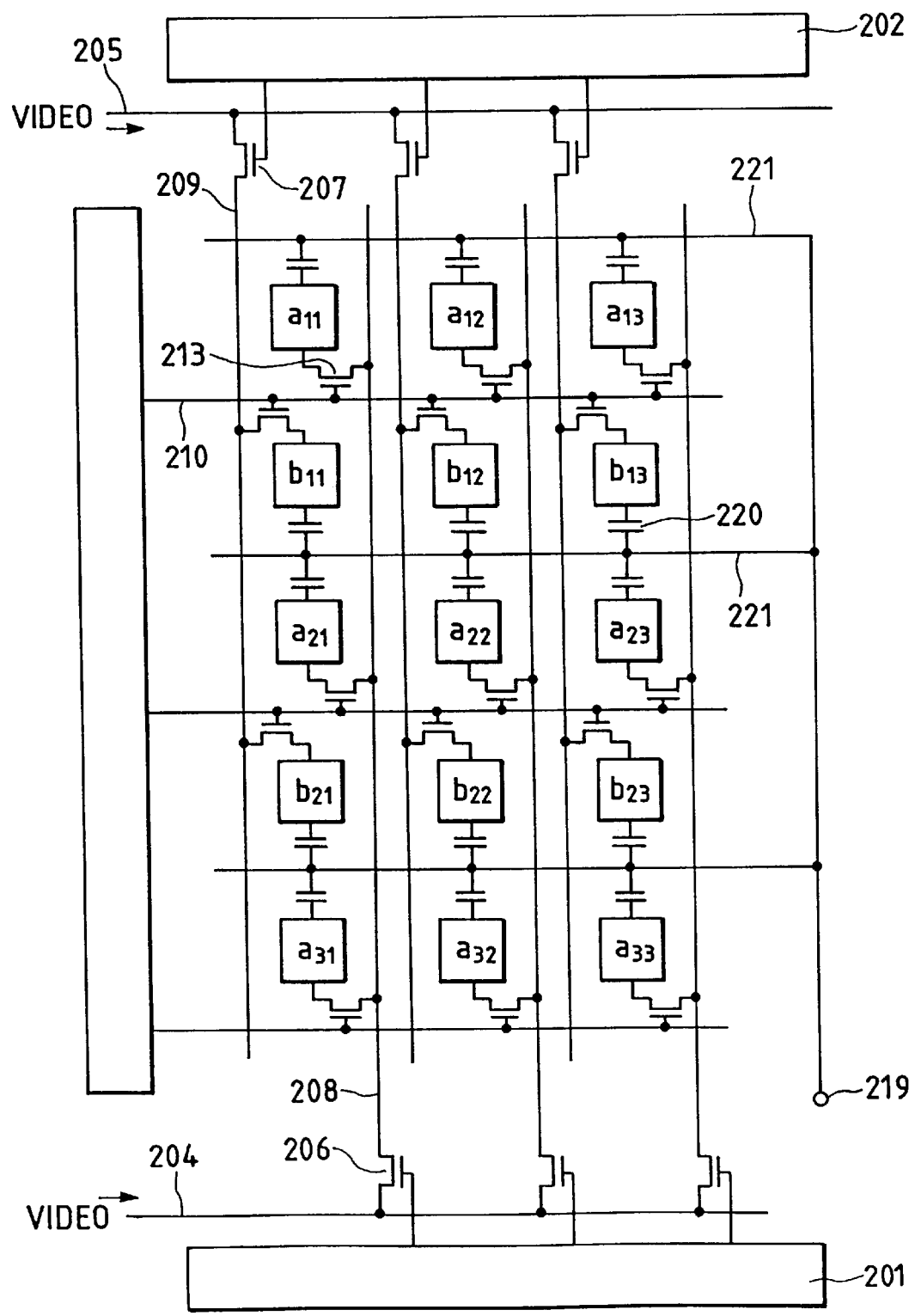
FIG. 5 is a schematic equivalent circuit diagram of a liquid crystal panel that can be used for a display apparatus according to the invention.

In the embodiment having a configuration as described above, video signals are read out of the frame memories and subjected to a series of processing operations such as clamping, amplification, δ correction and polarity inversion by the LCD drive system of FIG. 2 and then fed to the video signal lines 204 and 205 of FIG. 5. Thus, signals are collectively read out of the frame memories of every pair of adjacently disposed rows on a non-interlaced scanning basis and signals for the odd row are fed to the video line 204 while those for the even row are sent to the video signal line 205.

Stored video signals are then sampled by the horizontal shift registers 201 and 202. As seen from FIG. 5, the odd rows and the even rows are horizontally displaced from each other in this embodiment. Therefore, signals can be sampled with a same pulse for each paired odd and even rows without being subjected to field-through noises caused by other pulses so that consequently fine images are displayed at all times.

Additionally, the embodiment is capable of operating for writing data collectively in the memories of every pair of rows, for the first and second rows, for the third and fourth rows and so on, on an interlaced scanning basis as well so that the frequency of horizontal scanning operations is reduced to a half of that of ordinary scanning operations. The advantage of this arrangement is obvious in view of the fact that, in conventional display apparatus, large transistors having a high driving potential are used for sampling transistors that correspond to the transistors 206 and 207 of the above embodiment because, as the number of pixels rises, the sampling frequency increases disproportionally, requiring an enhanced level of driving potential for the transistors.

Thus, as the embodiment does not require large liquid crystal panels and small chips are used for the peripheral circuits, the overall size and cost of the liquid crystal panels of the embodiment are remarkably reduced.

While a pair of video lines are arranged in the circuit of FIG. 5, one for the odd rows and one for the even rows, the frequency of sampling operations can be further reduced by arranging more than two video lines and more than two shift registers. In FIG. 5, a drive line is arranged between the first and second rows, between the third and fourth rows and so on, whereas an addition capacitance line 221 is arranged between the second and third rows, between the fourth and fifth rows and so on. With this arrangement, the addition capacitances are free from problems such as a fluctuated voltage and maintain a desired voltage level to ensure fine displayed images.

Note that, with the above described arrangement, a satisfactory display of finely defined images reflecting the number of pixels is ensured for the apparatus by the fact that non-interlaced scanning operations are conducted in the vertical direction and pixels are not displaced in the horizontal direction.

Now, an advantageous design of the pixel section of a liquid crystal panel that can be used for the embodiment of a display apparatus will be described by referring to FIG. 6. The pixel section of the liquid crystal panel of FIG. 6 comprises wirings 208 and 209 for signal lines, drive lines 210, wirings 221 for connecting addition capacitances to a power source, contacts 230 each for connecting a signal line and the source region of a TFT and paired TFT gates 231. Each broken line 232 shows a polycrystalline Si layer having a thickness of 200 to 600 Å and forming the source, channel and drain of a TFT.

The pixel section additionally comprises contact regions 233, each connecting an electrode 234 and a reflection electrode, electrode layers 236, each arranged on a polycrystalline Si layer from which a drain is extended and where an addition capacitance is formed along with a wiring 210 and a gate 231, and contacts 237, each connecting said electrode and the polycrystalline Si layer from which a drain is extended, said contacts operating just like the contacts 233. While the polycrystalline Si layer from which drains are extended is very thin and electrically very resistive as described above, since the electrodes 234 are made of metal and each of them is held to an electric potential level the same as that of the corresponding drain and provided with a plurality of contacts as shown in FIG. 6, the drain voltage is held constant regardless of its location.

Figure 6:
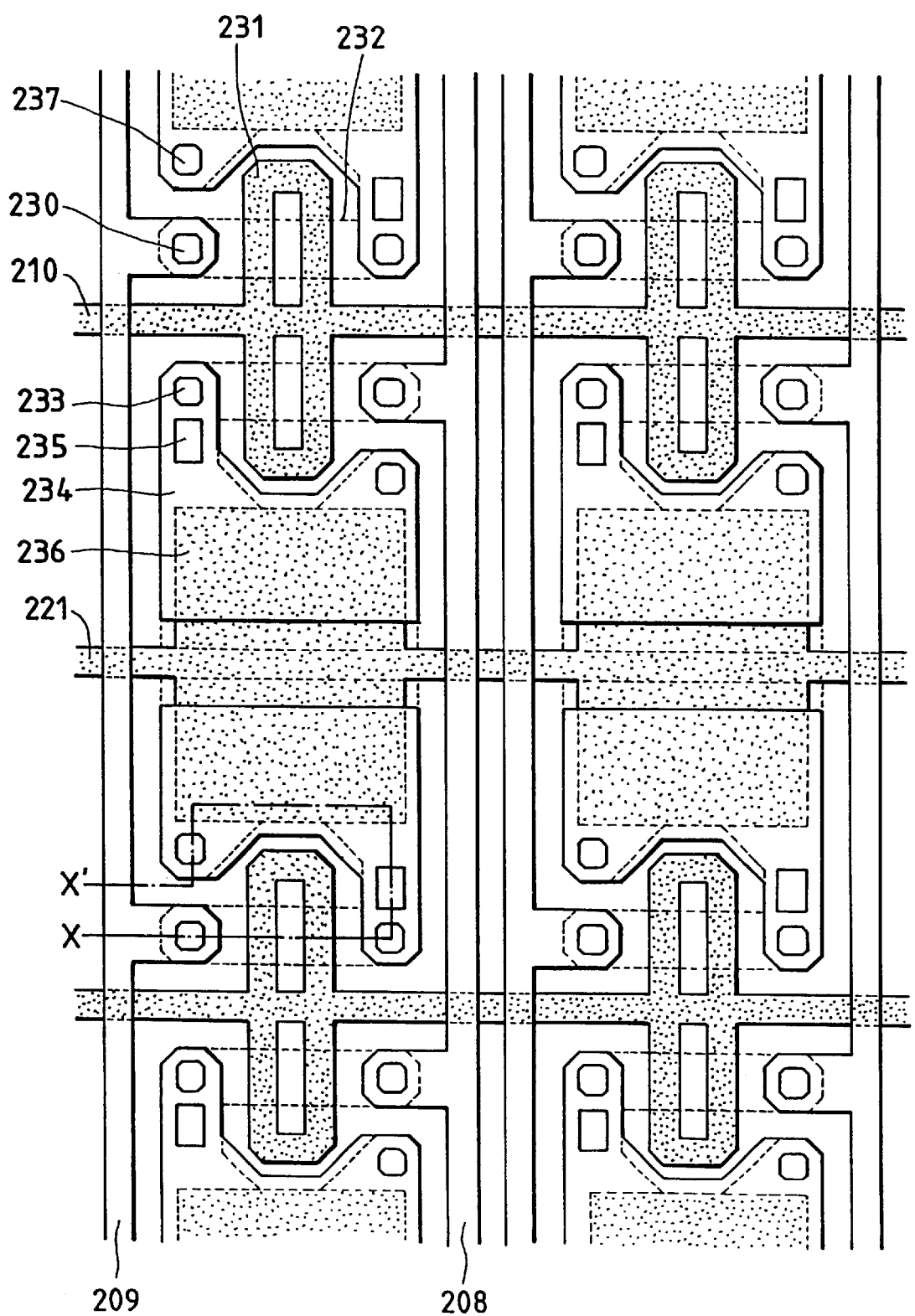
FIG. 6 is a schematic partial plan view of a liquid crystal panel that can be used for a display apparatus according to the invention, showing its configuration.
Figure 7:
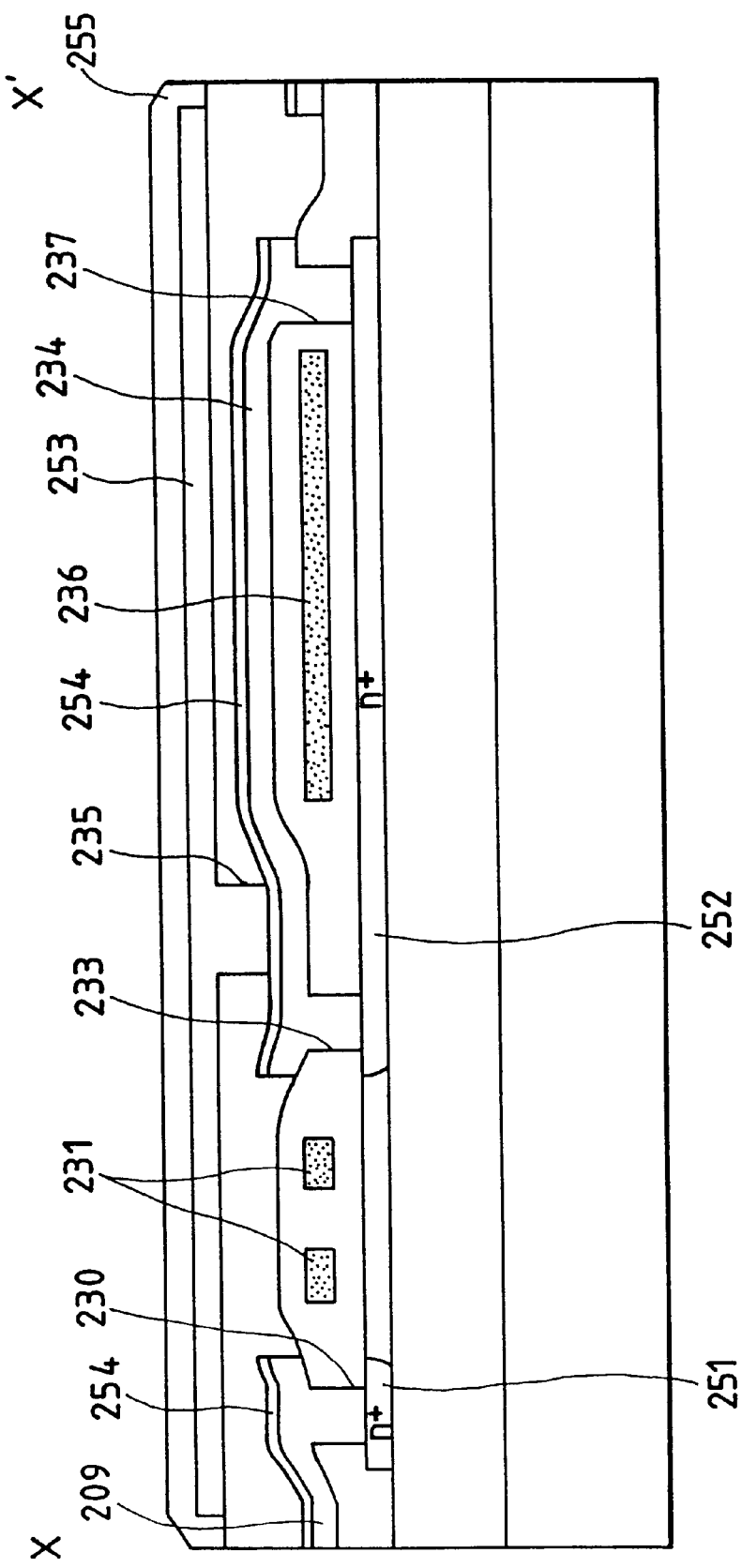
FIG. 7 is a schematic lateral sectional view of a part of the liquid crystal panel of FIG. 6 taken along line X–X' in FIG. 6.

FIG. 7 is a schematic sectional view of a part of the liquid crystal panel of FIG. 6 taken along line X–X' in FIG. 6. Note that the same parts are denoted by the same reference numerals in both drawings and will not be described any further. In FIG. 7, reference numeral 251 denotes a source region of a TFT comprising an $n^+$ diffusion layer and reference numeral 252 denotes a drain region comprising an $n^+$ diffusion layer while reference numeral 253 denotes a reflection pixel electrode.

As seen from FIG. 7, the reflection pixel electrode 253 shows an even and flat layer profile at the bottom. While a flat profile may not be easily obtained in an area near the contact 235 of the reflection pixel electrode 253 and the electrode 234, it is not possible to achieve at least a degree of flatness as shown in FIG. 7 if an appropriate substance such as W is used for selective growth.

The surface of the gate 231 and that of the addition capacitance 236 made of polycrystalline Si are covered by W whereas the surface of the electrode 234 and that of the wiring 209 are covered by a layer 254 of a substance such as TaN that is darker in appearance than ordinary metals. Such a TaN layer is also arranged in a lower portion of the gap 255 separating two adjacent pixel electrodes in order to prevent rays of light from leaking away to degrade the quality of the image being displayed on the screen as they strike the TFT.

As described above, the pixel section of each liquid crystal panel of the embodiment is made to show a very flat profile in order to eliminate any undesired scattering components of light at the reflection pixel electrode, to improve the efficiency of utilizing light and to consequently produce bright images. Since the peripheral circuits for driving the pixels comprises bulk Si transistors, the embodiment has an enhanced level of driving potential for driving pixels designed to display finely defined images. Additionally, the horizontal scanning speed of the liquid crystal panel can be reduced by designing an appropriate circuit configuration for the panel so that the panel may be driven to operate at a low power consumption rate while stably displaying fine images by using small chips.

Still additionally, since the horizontal scanning clock can be driven with a reduced load, clock field through noises can be effectively prevented from entering the panel so that images can be displayed on the screen with a high S/N ratio.

Finally, by arranging a screening member made of an appropriate material such as TaN at the bottom of the gap separating any two adjacent reflection electrodes, the level of noise to which reflected light is subjected can be remarkably reduced and, at the same time, the inside of each TFT can be protected against leaking light to ensure well contrasted images to be displayed on the screen. Reflection of light on the surface of the opposite substrate can be significantly reduced by arranging an anti-reflection member also to ensure well contrasted images to be displayed on the display screen.

[Embodiment 2]

Figure 8:
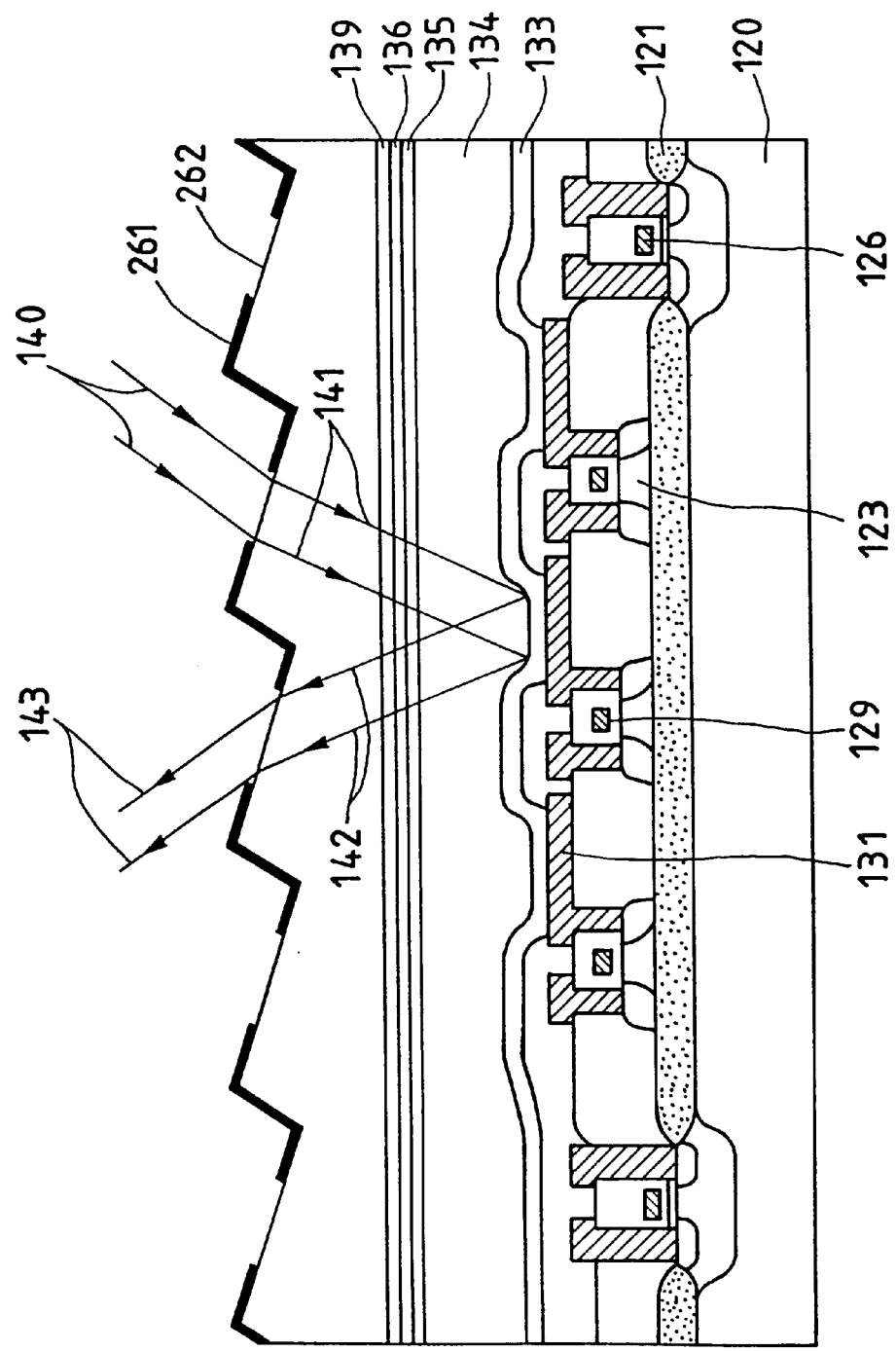
FIG. 8 is a schematic lateral sectional view similar to FIG. 4 but showing another liquid crystal panel that can be used for a display apparatus according to the invention.

A second embodiment of the invention will now be described by referring to FIG. 8. In FIG. 8, parts that are the same or similar to those of FIG. 4 are denoted by the same reference numerals and they will not be described any further.

This embodiment differs from the first embodiment in that the opposite substrate is of brazed type and tilted relative to the reflection electrode 131 for each Si transistor in each liquid crystal panel of the embodiment. With such an arrangement, the screening layer 261 is also inclined relative to the reflection electrode 131 by a desired angle. Thus, the regularly reflected light from the screening layer 261 and the transparent region 262 is completely separated from the regularly reflected light from the reflection electrode to further improve the contrast of the images displayed on the display screen of the embodiment.

[Embodiment 3]

A third embodiment of the invention will be described below by referring to FIG. 9.

This embodiment is also characterized by a specifically designed configuration of the liquid crystal panels of the embodiment. In FIG. 9, parts that are the same or similar to those of FIG. 4 are denoted by the same reference numerals and they will not be described any further.

This embodiment differs from the first embodiment in that the reflection electrode 271 is tilted for each Si transistor. Thus, the reflected light from the reflection electrode is completely separated from the regularly reflected light from the front and rear surfaces of the opposite substrate 138 to further improve the contrast of the images displayed on the display screen.

Figure 9:
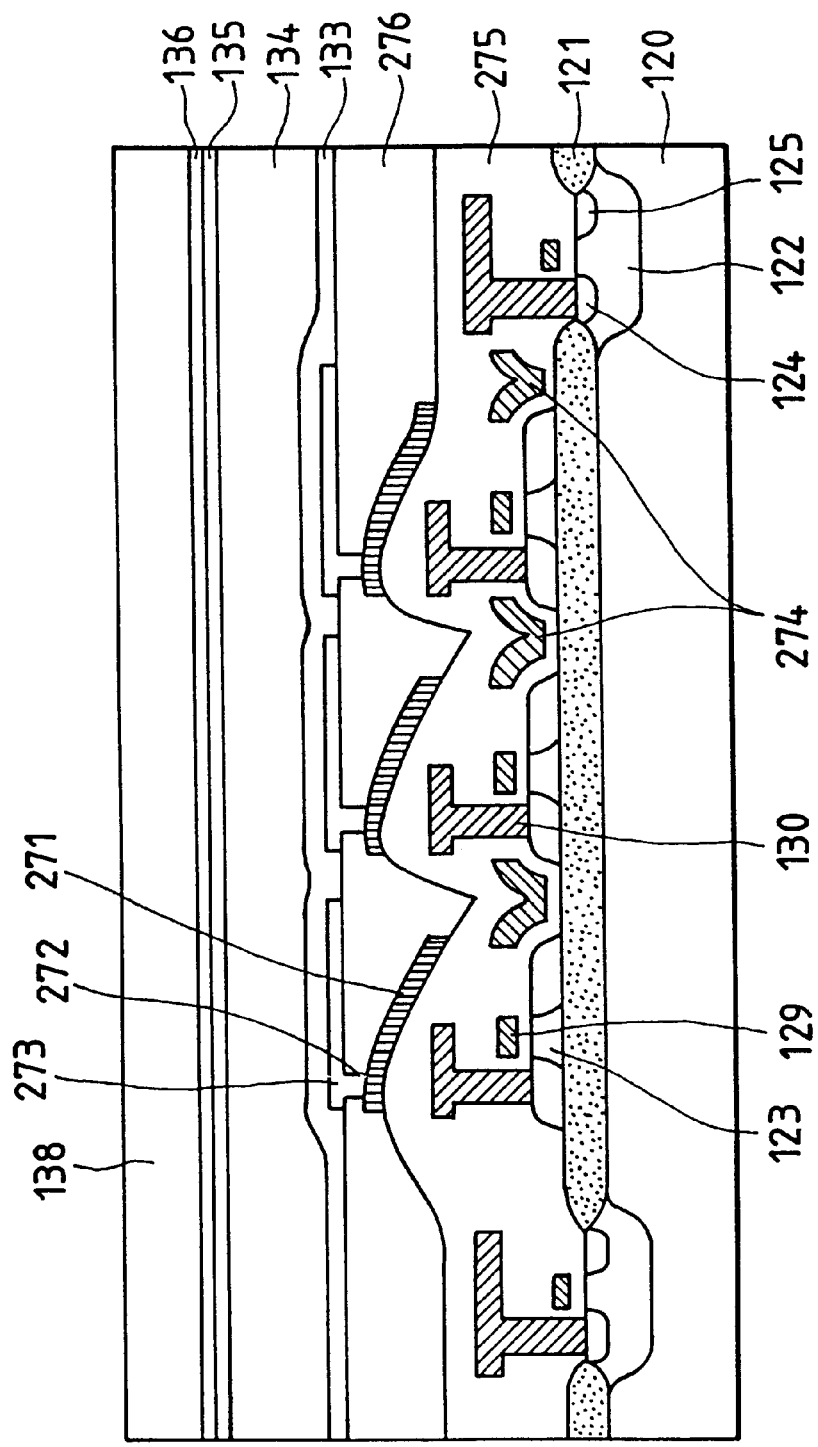
FIG. 9 is a schematic lateral sectional view similar to FIG. 4 but showing still another liquid crystal panel that can be used for a display apparatus according to the invention.

As seen from FIG. 9, since no anti-reflection film is required for the opposite substrate, the apparatus can be realized at further reduced cost. Additionally, as no screening layer is required, a high aperture ratio is achieved to realize bright displayed images.

While electric connection between the drain of each TFT and the reflection electrode 271 is not shown in FIG. 9, it is realized in a cross sectional plane different from that of FIG. 9. The reflection electrode may be connected to the drain either by directly connecting them or by interposing therebetween a metal wire of the type used for signal lines.

The reflection electrode of this embodiment can be tilted by arranging the polycrystalline Si layer 123, the polycrystalline Si layer 129 of the gate and the signal wire 130 in the above mentioned order as shown in FIG. 9 to produce a stepped profile. The interlayer film 275 comes to the illustrated profile when the stepped areas are smoothed by using an appropriate technique such as resist etch back.

A polycrystalline Si layer 274 is arranged in the gap separating any two adjacent reflection electrodes 271 and covered by a metal layer. The polycrystalline Si layer may be part of the gate polycrystalline Si layer 129 so that no additional masks nor additional processing steps may be required to produce it. The provision of such a polycrystalline Si layer reduces the resistance of the drive lines to allow it to realize a high speed drive operation.

After forming the reflection electrode 271, a flat overall profile is produced by arranging another interlayer film 276, and the reflection electrode 271 is made to contact with the transparent electrode 273 which is typically made of ITO by way of a through hole 272. An excellent contact can be realized between the reflection electrode 271 and the transparent electrode 273 by forming a thin and smooth film of a titanium compound such as TiN to a thickness of several hundreds to several thousands Å on the surface of the reflection electrode 271. Since a liquid crystal layer is formed between the opposite electrode 136 and the smoothed transparent electrode 273 by injection, an electric field is evenly applied to them and no uneven distribution of electric field will be observed there. Besides, since the reflected light from the surface of the opposite electrode can be rigorously separated from the light reflected by the reflection electrode if the latter is tilted by only a small angle of inclination, the transparent electrode can 273 can be omitted if the angle of inclination is small and the unevenness that may be observed in the distribution of electric field is negligible.

[Embodiment 4]

A fourth embodiment of the invention will be described below by referring to FIG. 10.

This embodiment is designed to project images on the display screen practically without distortions and blurs. As shown in FIG. 10, it comprises a light source 281, a focusing lens 282, a micromirror 283, a screening plate 284 having a pinhole 285 and a lens 286, the screening layer 284, the micromirror 283 and the pinhole 285 being arranged at the focal point of the lens 286 to establish a telecentric optical system. Reference numeral 287 denotes a reflection type liquid crystal panel, which may well be an inclined pixel electrode type liquid crystal panel as described above by referring to the third embodiment.

Figure 10:
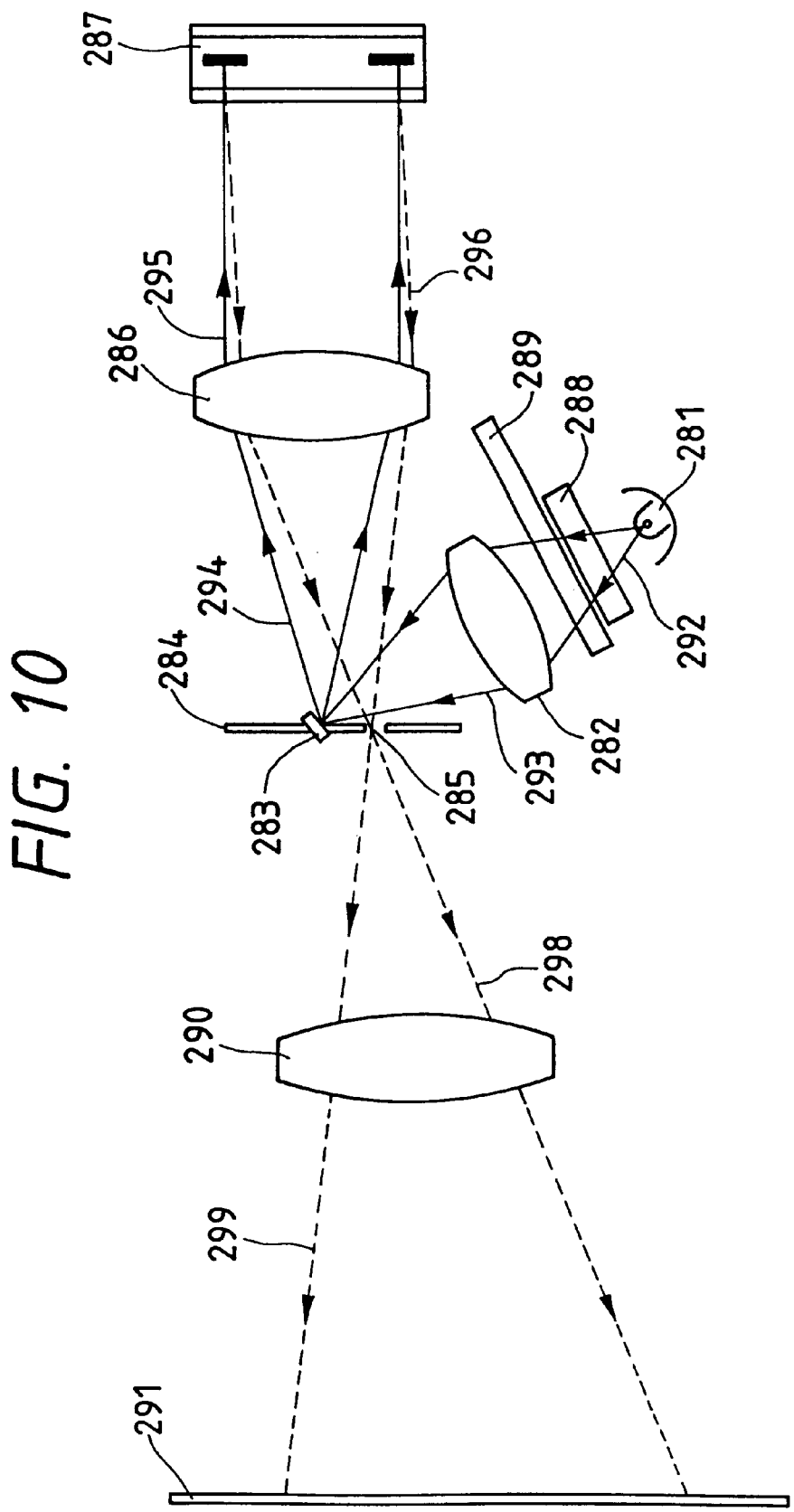
FIG. 10 is a schematic diagram of an optical system of a display apparatus according to the invention.

Reference numerals 288 and 289 in FIG. 10 respectively denote an IR cut filter and a color filter switching device for selecting a non-color filter status or a status of using a red, green or blue color filter. The embodiment additionally comprises a projection lens 290 and a display screen 291. As seen from FIG. 10, the reflection electrode and the display screen are arranged substantially in parallel with each other so that the image on the display screen may not be distorted nor blurred in peripheral areas and both vertically and horizontally of the projection lens 290 is not specifically designed for high performance at enhanced cost.

Referring to FIG. 10 of the above embodiment, the flux of light 292 emitted from the light source is focused on the micromirror 283 by the lens 282 after passing through the IR cut filter 288 and, if necessary, a color filter selected by means of the color filter switching device 289. Since the micromirror 283 is located on the focal point of the lens 286, it may be very small so long as it has a surface area sufficient to cover the light focused by the lens 282. The flux of light 294 reflected by the micromirror 283 then strikes the lens 286. Since the micromirror 283 is located at the focal point of the lens 286 as described above, the flux of light 295 coming from the lens 286 contains only parallel rays of light that eventually strike the liquid crystal panel 287. As shown, the flux of light 296 reflected by the liquid crystal panel 287 is slightly deflected from the track of the incident flux of light 295 and the focused by the lens 286 to the pinhole 285 if the liquid crystal panel 287 does not scatter rays of light of the flux of light it receives.

If, to the contrary, the incident rays of light are scattered by the liquid crystal panel 287, no parallel rays would practically be found among the rays of light reflected by the liquid crystal panel 287 so that the reflected rays of light are mostly blocked by the screening plate 284 and do not pass through the pinhole 285. The flux of light 298 that has passed through the pinhole 285, if any, is then projected onto the display screen 291 by the projection lens 290.

So, the optical system of this embodiment can produce projected images that are practically free from distortions and blurs.

[Embodiment 5]

Figure 11:
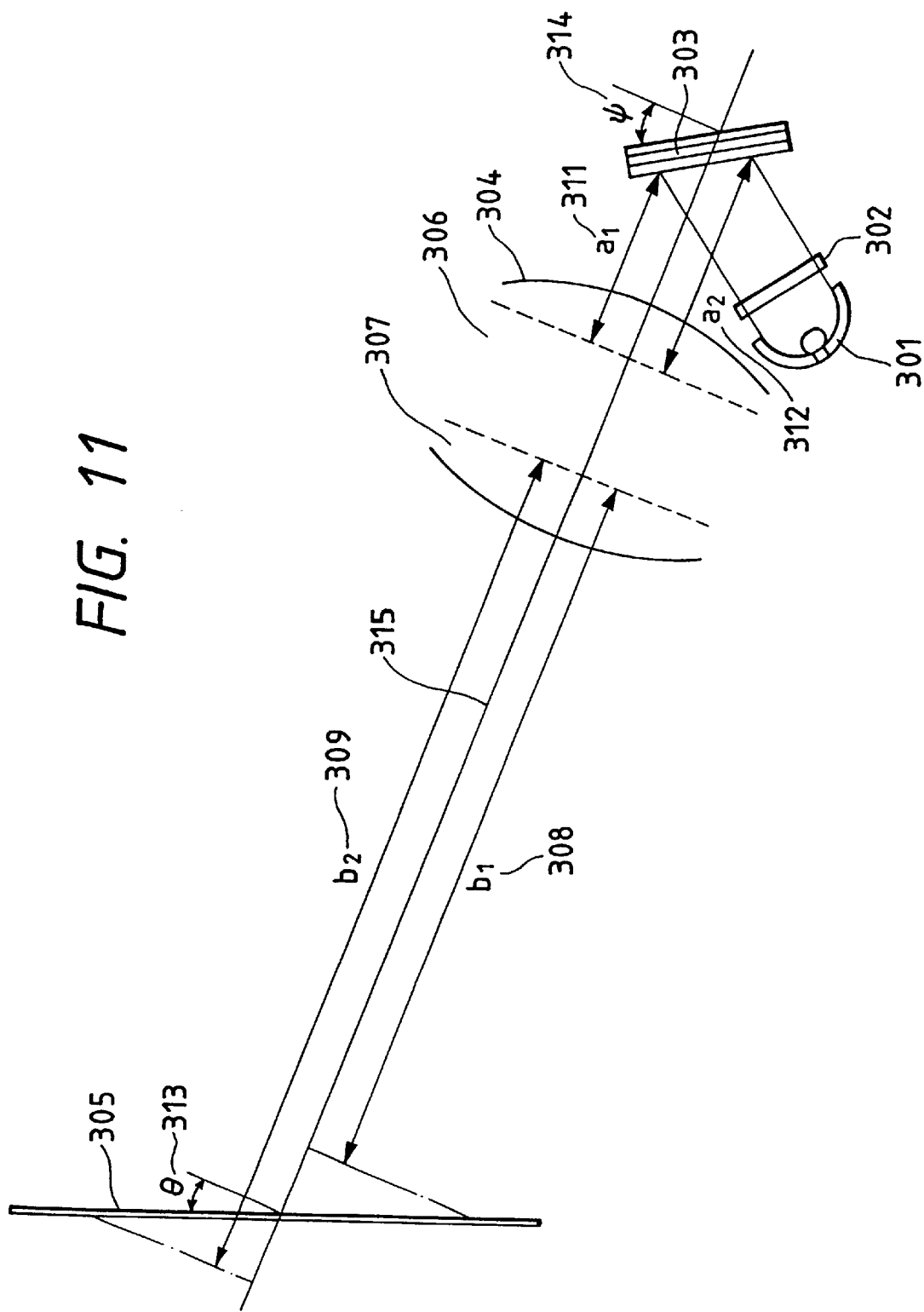
FIG. 11 is a schematic diagram similar to FIG. 10 but showing another optical system of a display apparatus according to the invention.

FIG. 11 shows the display system of a fifth embodiment of the invention. It comprises a light source 301 provided with an optical system for producing parallel rays of light, an IR cut filter or a color filter 302, a reflection type liquid crystal panel 303, an aggregate optical system 304 including a schlieren optical system and a projection optical system and a display screen 305.

As shown in FIG. 11, the projection type display apparatus of this embodiment is normally placed on a table or suspended from the ceiling. Therefore, seeing from the display screen, the optical axis of the optical system 304 never stands rectangularly from it if the display screen itself is tilted. Thus, there always exist an angle θ indicated by reference numeral 313 between the display screen and a line perpendicular to the optical axis. The net result will be a distorted image due to the difference in the degree of magnification between the top and the bottom of the display screen.

This embodiment, however, makes it possible to display distortion-free images with an arrangement as described above. The point lies in that the surface of the liquid crystal panel shows an angle of ψ indicated by reference numeral 314 relative to a line perpendicular to the optical axis of the optical system 304. How to determine the angle will be described below.

The aggregate optical system 304 has an entrance pupil 306 and an exit pupil 307. Assume now that, when measured along the optical axis 315 of the aggregate optical system 304, the distance between the top of the display screen 305 and the exit pupil is b2 (309) and the distance between the bottom of the display screen 305 and the exit pupil is b1 (308) while the distance between the top of the liquid crystal panel 303 and the entrance pupil 306 of the aggregate optical system is a1 (311) and the distance between the bottom of the liquid crystal panel and the entrance pupil 306 of the aggregate optical system is a2 (312). Then, the magnification of the image on the display screen will be b2/a2 for the top of the liquid crystal panel 303 and b1/a1 for the bottom of the liquid crystal panel 303. An agreeable image can be obtained on the display screen by minimizing the difference of the two magnifications and selecting a value for the angle θ that makes the image on the display screen confined within the depth of focus of the optical system. The light source 301 and other components may be so arranged as to optimize their positional relationship with the angle selected for the display screen.

[Embodiment 6]

Figure 12A:
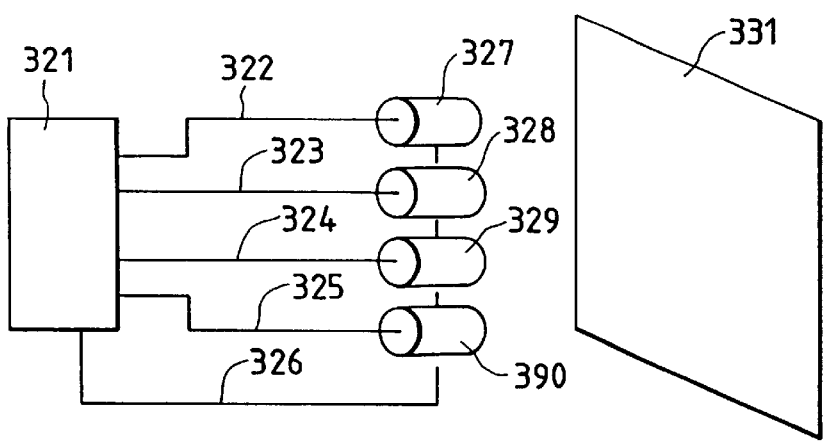
FIGS. 12A to 12E are schematic diagrams showing the operation of a display apparatus according to the invention.
Figure 12B:
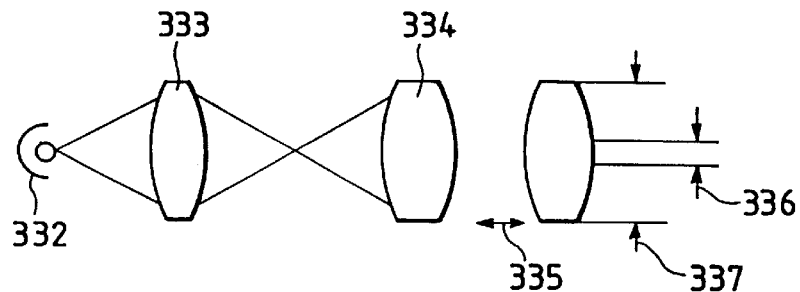
Figure 12C:
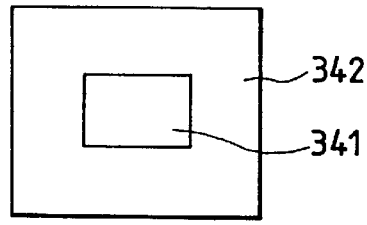
Figure 12D:
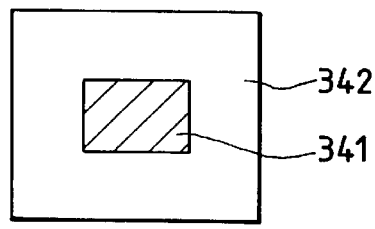
Figure 12E:
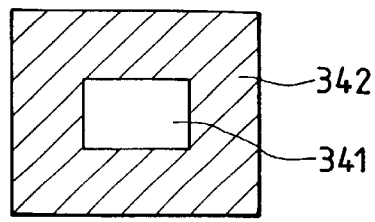

A sixth embodiment of the invention will be described by referring to FIGS. 12A to 12E. FIG. 12A shows a schematic configuration of the display apparatus of this embodiment when it is used for combining an image in black and white and another image in color on the display screen of the embodiment, and FIG. 12B schematically illustrates the optical system of the display apparatus of FIG. 12A, while FIG. 12C shows a projected combined image on the display screen and FIG. 12D and FIG. 12E illustrate projected images in black and white and in color respectively. The apparatus comprises a decoding/image synthesizing section 321 that corresponds to the section 14 of FIG. 2, a luminance signal output line 322, red, green and blue composite signal output lines 323 through 325 and a black and white and color display areas specifying signal output line 326. Additionally, it comprises optical display systems 327 through 330 exclusively used for black and white, red, green and blue respectively, each having a driver to be used for liquid crystal. Reference numeral 331 denotes a display screen.

The fluxes of light emitted from the four optical display systems are focused on a single display screen. FIG. 12C shows the display screen where an image of characters and/or graphs is displayed on a peripheral area 342 in black and white and a moving image is displayed on the remaining central area 341.

To realize the effect of FIG. 12C, the optical display system 327 for black and white is fed through the signal output line 322 with a black signal for the central area 342 to reserve it for color display and with an image signal for the peripheral area 342 as shown by FIG. 12D. Meanwhile, the optical display systems 328 through 330 for different colors are fed with respective color image signals for the central area 341 and with a black signal for the peripheral area 342 as shown by FIG. 12E. Thus, a synthesized image as shown by FIG. 12C is realized by combining the images of FIG. 12D and FIG. 12E.

Generally, color images can be less bright than black and white images in a same display apparatus. However, with the above described embodiment where color is used for a central area of the display screen, the diameter of the flux of light directed toward a liquid crystal panel can be modified to raise or lower the intensity of light by using the lens arrangement as shown by FIG. 12B, where lens 334 can be moved back and forth for that purpose along arrow 335. With this arrangement, the flux of light emitted from light source 332 passes through a lens 333 before it enters the lens 334. As the lens 334 is moved back and forth along arrow 335, the flux of light can be modified to become a narrow flux as shown by 336 or a wide flux as shown by 337.

If color is used for not a central area but a peripheral area of the display screen, the brightness of the displayed color image can be modified without difficulty by appropriately arranging a mirror or by using some other means.

Thus, with the above embodiment, images can be displayed with an enhanced level of brightness and contrast even if they are partly in black and white and partly in color.

[Embodiment 7]

The embodiments described hereafter relate to liquid crystal panels that can be used not only for a video information display system and a display apparatus in particular according to the invention, but also as transmissive type liquid crystal panels.

More specifically, liquid crystal panels of the embodiments described hereafter are active matrix liquid crystal panels comprising a device substrate provided with switching devices and pixel electrodes arranged on the respective spots defined by data signal wirings and scan signal wirings and an opposite substrate provided with opposite electrodes arranged on the respective spots located directly opposite to the corresponding pixel electrodes, wherein said scan signal wirings are grouped into alternately arranged first and second scan signal wirings, first pixel electrodes to be selected by the first scan signal wirings and second pixel electrodes to be selected by the second scan signal wirings being spatially displaced from each other, and said data signal wirings are grouped into alternately arranged first and second data signal wirings, said first pixel electrodes being connected to said first data wirings by way of said switching devices, said second pixel electrodes being connected to said second data wirings by way of said switching devices.

Figure 13:
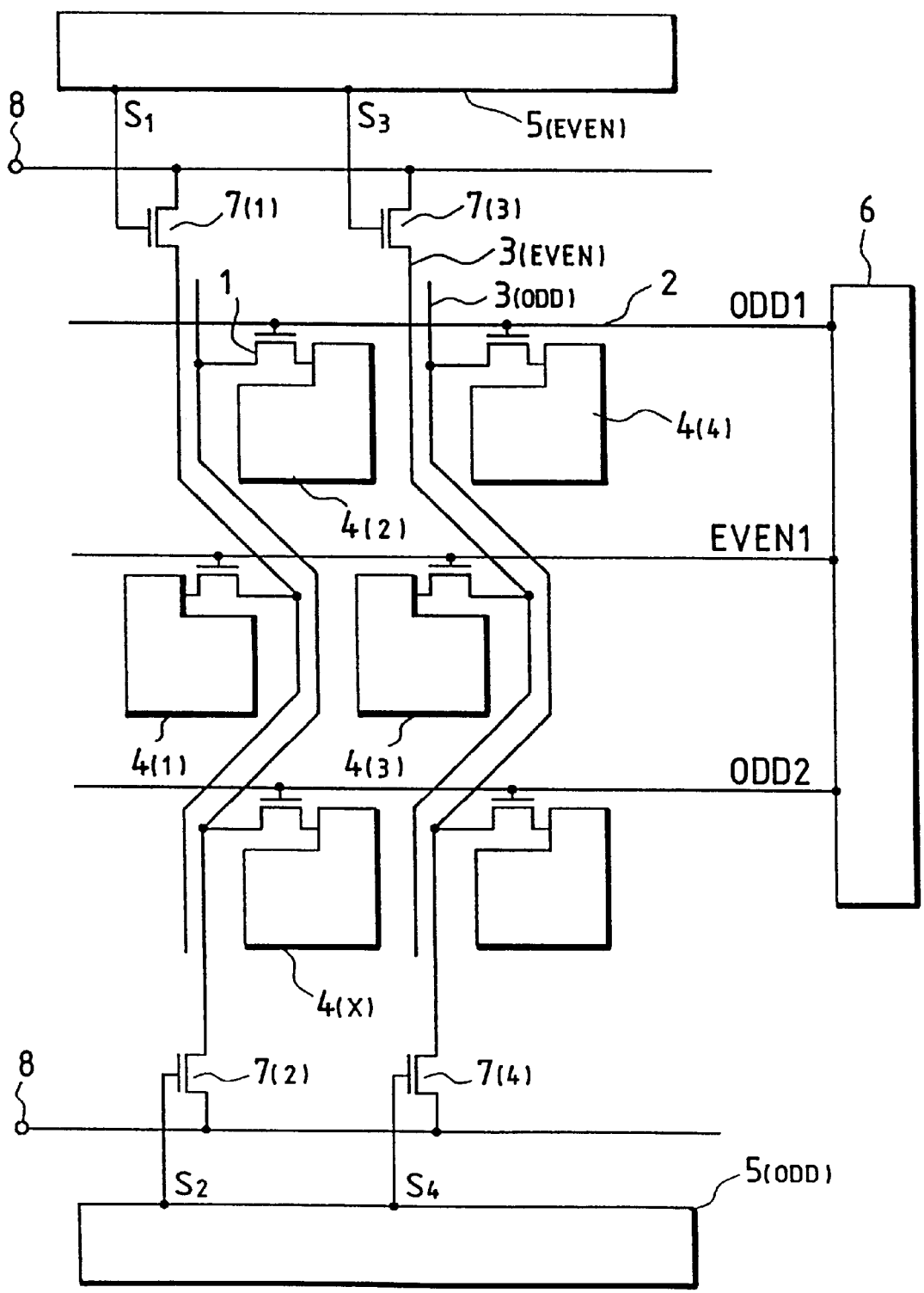
FIG. 13 is a schematic equivalent circuit diagram similar to FIG. 5 but showing another liquid crystal panel that can be used for the purpose of the invention.

The embodiment will now be described by referring to FIGS. 13 through 16C. In FIG. 13, there are shown signal lines 3(ODD) connected to pixels on odd rows, signal lines 3(EVEN) connected to pixels on even rows and horizontal shift registers 5(ODD) and 5(EVEN) for transferring video signals to target pixels by way of the signal lines 3(ODD) and 3(EVEN) by driving respective video signal transfer switches 7.

Figure 14:
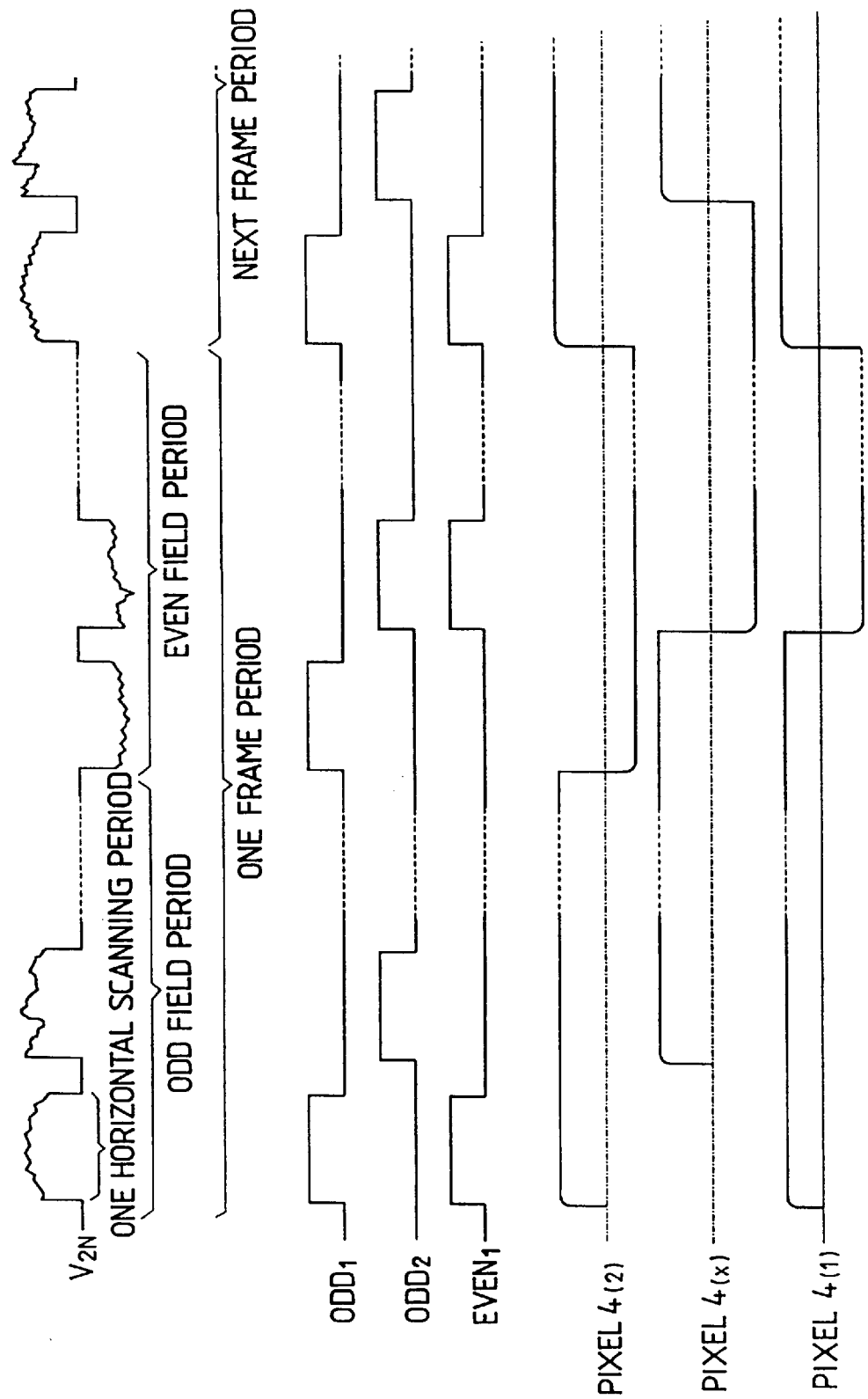
FIG. 14 is an operation timing diagram of the liquid crystal panel of FIG. 13.

FIG. 14 shows a timing chart for pulses for driving an active matrix liquid crystal panel to be suitably used for this embodiment. The polarity of the video signal is switched for every field period (about ⅟60 seconds for NTSC) in order to eliminate flickering.

Take, for example, an odd frame period. As shown in FIG. 14, in a horizontal scanning period of that frame period, scan signals are sent to the scanning line of an odd row (ODD1) and that of an adjacent even row (EVEN 1) almost simultaneously to energize the switching devices 1 of the adjacent two rows.

Figure 15:
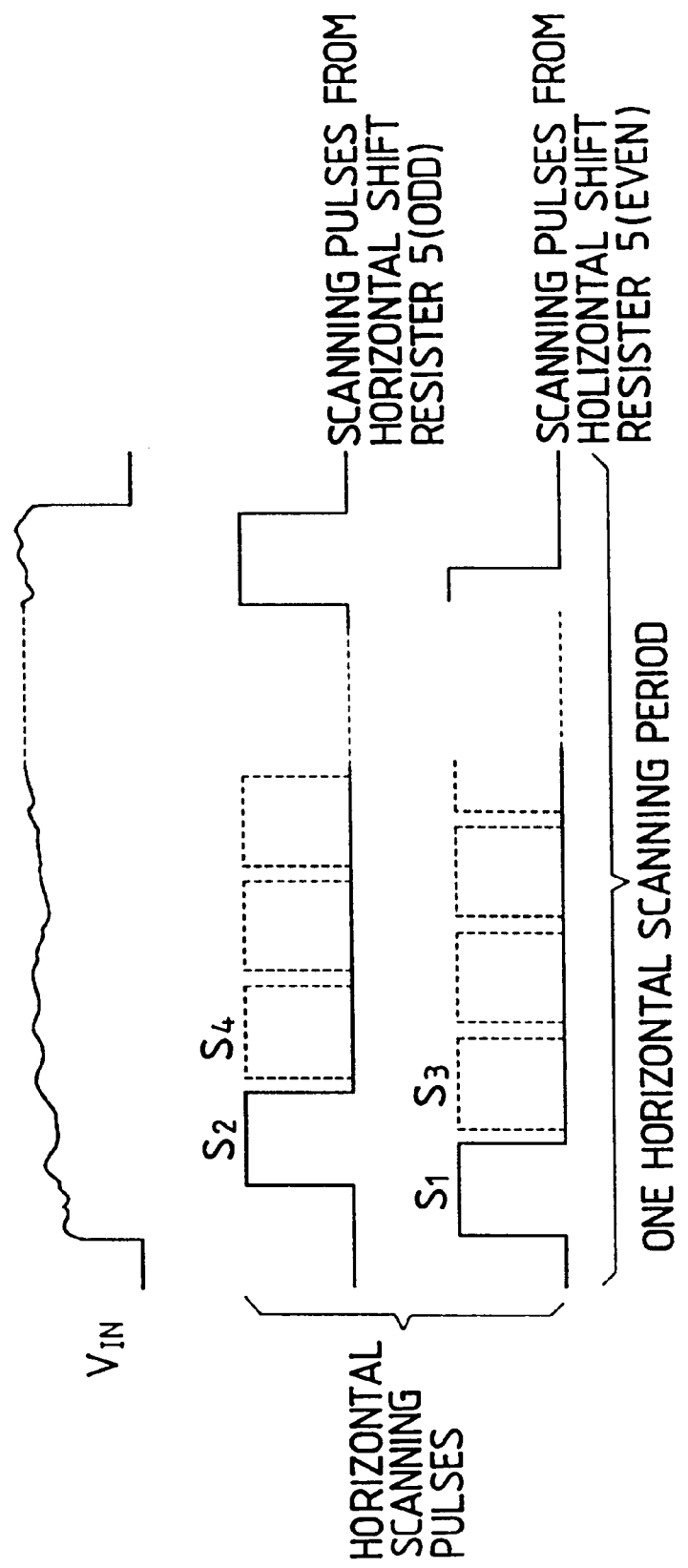
FIG. 15 is another operation timing diagram of the liquid crystal panel of FIG. 13.

Meanwhile, as shown in the timing chart of FIG. 15, video signals to be recorded on the liquid crystal are actually stored in the pixel electrodes 4 of the pixels by way of the transfer switches 7 that are sequentially driven by the horizontal shift registers 5 for transmitting horizontal scanning pulses in synchronism with the video signals. More specifically, transfer switch 7(1) is energized by pulse S1 from horizontal shift register 5(EVEN). Then, transfer switch 7(2) is energized by the next pulse S2 from horizontal shift register 5(ODD) and a video signal is written into pixel electrode 4(2). In this way, video signals are written into pixels at timings that correspond to horizontal spatial positions of the pixels by means of a couple of paired shift registers. With this arrangement, pixels of adjacent rows do not have to be horizontally displaced in a zigzag manner as in the case of the known conventional arrangement so that the axial horizontal resolution of the displayed image is improved and the period of polarity inversion for video signals is reduced to consequently eliminate disagreeable flickers.

Figure 16A:
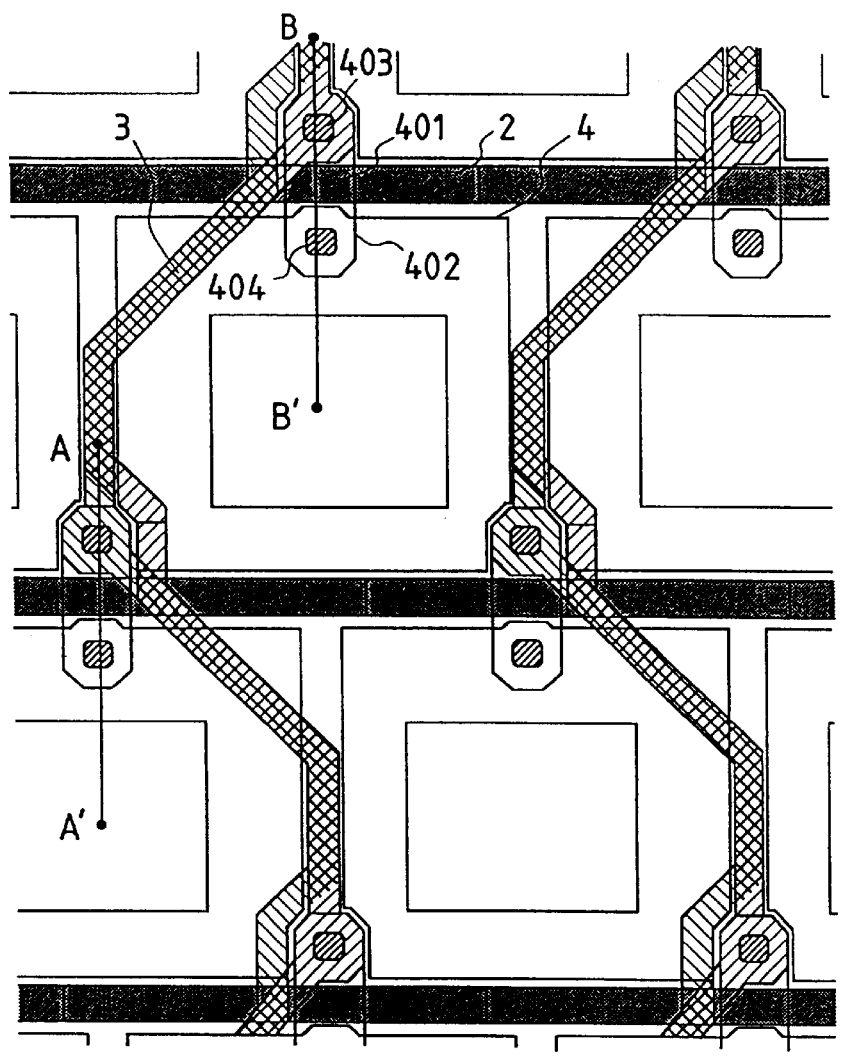
FIGS. 16A to 16C are schematic illustrations of still another liquid crystal panel that can be used for the purpose of the invention.
Figure 16B:
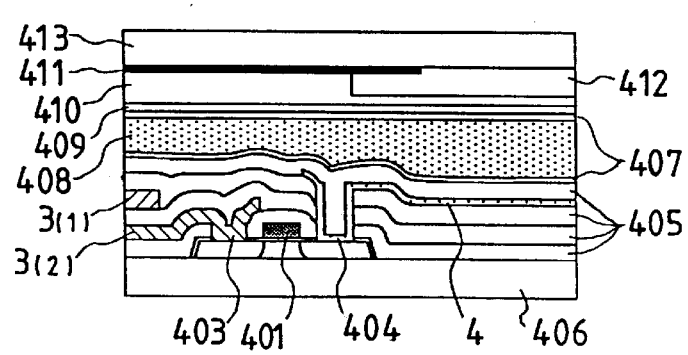
Figure 16C:
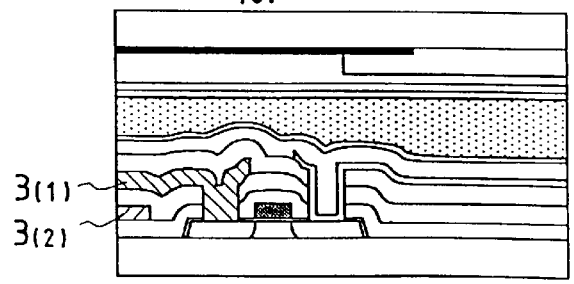

FIGS. 16A to 16C schematically illustrate part of the pixel section of the liquid crystal panel of this embodiment. Each switching device is a TFT. FIGS. 16B and 16C respectively show cross sectional views taken along lines A–A' and B–B'. Each device comprises a gate electrode 401, a semiconductor layer 402, a source electrode 403 and a drain electrode 404. Additionally, it also comprises an interlayer insulation layer 405, a substrate 406, a pair of oriented films 407, a liquid crystal member 408, an opposite transparent electrode 409, an interlayer film 410, a screening layer 411 and a color filter layer 412, which is not required for displaying black and white images. Reference numeral 413 denotes an opposite transparent substrate.

As seen from FIGS. 16A to 16C, a gate electrode 401 is formed on a semiconductor layer 402, which is formed on an insulating transparent substrate 406, with an interlayer insulation film 405 disposed therebetween and, after forming an interlayer insulation layer 405 for shielding, contact holes are bored through the interlayer insulation layer 405 to form a source electrode 403 and a drain electrode 404. The semiconductor layer 402 is typically made of polycrystalline Si, noncrystalline Si (a-Si) or monocrystalline Si while the gate electrode 401 and scanning line are typically made of polycrystalline Si, a-Si, which is a material that can be advantageously used for vapor deposition, or metal such as aluminum (Al). The source electrode 403 and the signal line 3 are made of metal such as aluminum (Al) whereas the drain electrode 404 and the pixel electrode 4 are typically made of transparent ITO (indium-tin-oxide). While signal lines are formed in different layers (A11, A12, . . . ) in FIGS. 16A to 16C, they may alternatively be formed in a same wiring layer.

Apart from the TFT substrate, a screening layer 411 is formed on the opposite substrate 413 by using an appropriate material such as chromium (Cr) and a color filter 412 is formed thereon. After arranging an interlayer film 410 for shielding, an opposite transparent electrode is formed on the interlayer film. The opposite electrode is typically made of ITO. It may be needless to say that a screening layer may alternatively be formed on the side of the TFT substrate or on both of the substrates.

An oriented film 407 is formed on the surface of the TFT substrate and on that of the opposite substrate. The oriented films 407 are typically made of polyimide. After the films are oriented, the substrates are secured to each other with a gap member arranged therebetween and liquid crystal is poured into the gap between the substrates to produce a liquid crystal member 408.

As schematically illustrated in cross section in FIGS. 16A to 16C, by arranging a couple of paired signal lines 3 and connecting them alternately for source electrodes 403 of odd and even rows, a high resolution and a flicker-free viewing are realized for images to be displayed on the display screen. As described above by referring to the timing chart of FIG. 15, each pixel TFT remains energized for a horizontal scanning period so that a sufficient time period which is more than ten μseconds and up to tens of several μseconds is allocated to each pixel electrode for a single video signal wiring session. As a result, the pixels of the liquid crystal panel of the embodiment are ensured for an evenly sustained and enhanced level of performance to display well defined fine images.

While two signal lines are formed in layers in FIGS. 16A to 16C, they may alternatively be arranged as a single layer without adversely affecting the performance of the embodiment.

While the upper one of the two signal wirings is directly connected to the drain in FIGS. 16A to 16C, it may alternatively be connected to the drain by way of the lower wiring.

A two-terminal type device that operates as a diode such as MIM may be used for the switching device and a scan signal wiring may be arranged on the opposite electrode.

As described above, since different signal wirings are connected to switching devices for odd pixel rows and to those for even pixel rows and video signals are independently fed to different groups of pixels that are spatially arranged, flicker-free images can be displayed with an enhanced level of resolution on the liquid crystal panel of the embodiment, which can be realized at low cost because no external memories nor other additional devices need to be provided.

[Embodiment 8]

Figure 17A:
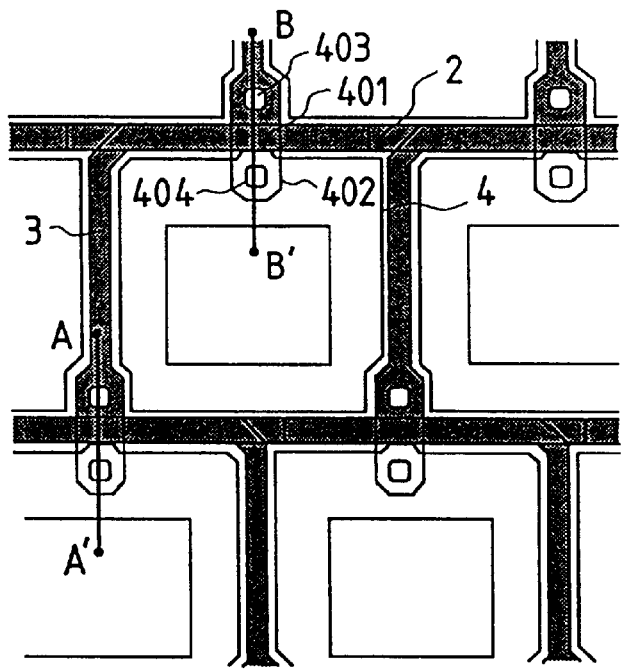
FIGS. 17A to 17C are schematic illustrations of still another liquid crystal panel that can be used for the purpose of the invention.
Figure 17B:
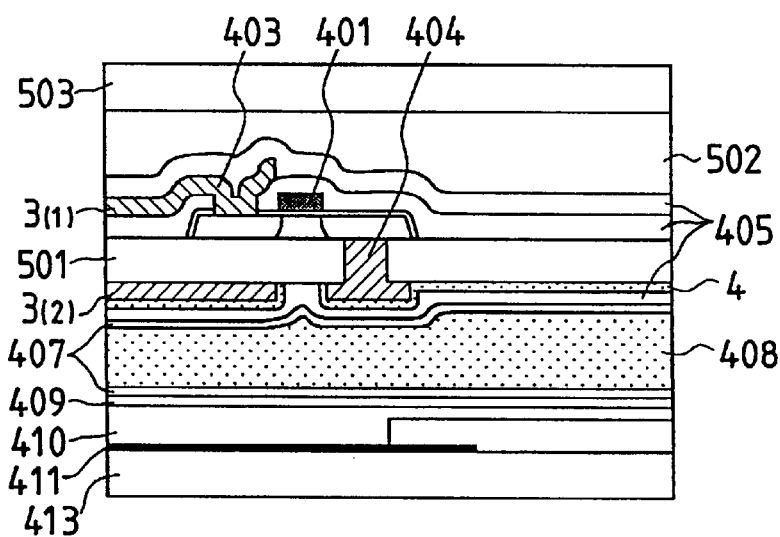
Figure 17C:
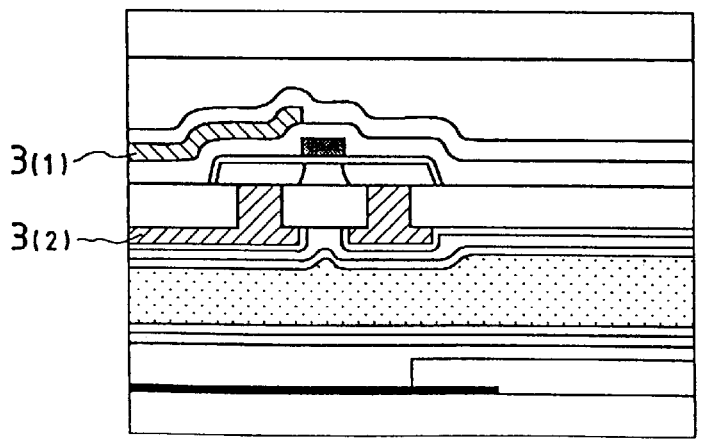

An eighth embodiment of the invention will be described by referring to FIGS. 17A to 17C and 18A to 18F, of which FIGS. 17A to 17C schematically illustrate part of the embodiment, which is a liquid crystal panel. FIGS. 17B and 17C respectively show the embodiment in partial cross section taken along lines A–A' and B–B'. This embodiment is characterized in that the pixel electrode and one of the two pairs of signal lines are arranged on the surface of the panel opposite to the TFT that operates as a switching device with an insulation layer interposed therebetween.

As the pixel electrode is arranged on the surface opposite to the TFT, the stepped profile of the liquid crystal panel around the pixel is significantly leveled for improved orientation. Generally speaking, defective orientation can take place in stepped areas of a liquid crystal panel so that molecules of the liquid crystal in such areas would not properly move as a function of the applied voltage. Then a poorly oriented area can remain locally pale if it is driven to turn black in a normally white mode to consequently deteriorate the contrast of the image being displayed there. Additionally, the thickness of the liquid crystal layer can vary in stepped areas to give rise to deviations in the transmissivity, a phenomenon referred to as retardation. While a TFT and two pairs of signal lines are arranged in layers on the surface for forming a pixel in the above described seventh embodiment and hence a process for leveling stepped areas is required for manufacturing it, such a process is not required for this embodiment. Additionally, as two pairs of signals lines are arranged separately on the respective opposite sides, wirings are less subjected to design-related restrictions. While the signal line 3(2) has to be arranged around the periphery of the source electrode 403 in an area where the signal line 3(1) is connected to the source electrode 403 in order to avoid short circuiting in the seventh embodiment, two pairs of signal lines of this embodiment do not encounter any impediments so that they are less subjected to wiring restrictions and hence the aperture ration of the pixel can be further improved.

Figure 18A:
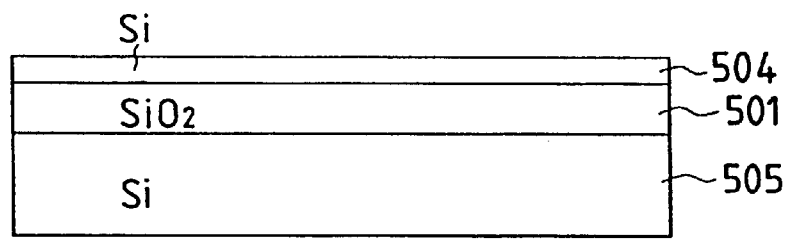
FIGS. 18A to 18F are schematic illustrations showing different steps of manufacturing a liquid crystal panel that can be used for the purpose of the invention.
Figure 18B:
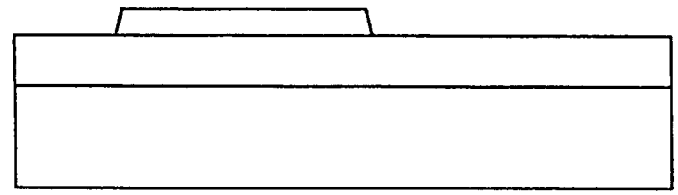
Figure 18C:
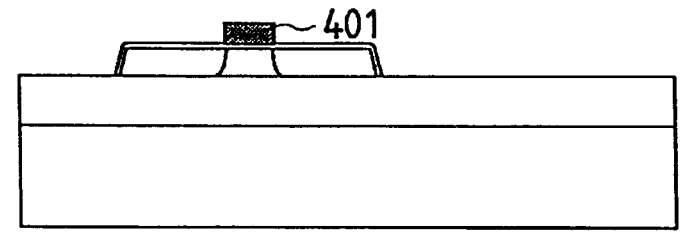

FIGS. 18A to 18F schematically illustrate in cross section different steps of manufacturing the embodiment. As seen from FIGS. 18A to 18F, an SOI (silicon on insulator) substrate comprising an Si layer 504, an insulation layer 501 typically made of $S1O_2$ and a substrate 505 is prepared as shown in FIG. 18A. Then as shown in FIG. 18B, the Si layer 504 is etched to produce a TFT forming region. The Si layer 504 is subsequently thermally oxidized to form a gate insulation film and then polycrystalline Si is deposited thereon and etched to produce a gate electrode 401, into which ions are injected to form source and drain regions there (FIG. 18C).

Figure 18D:
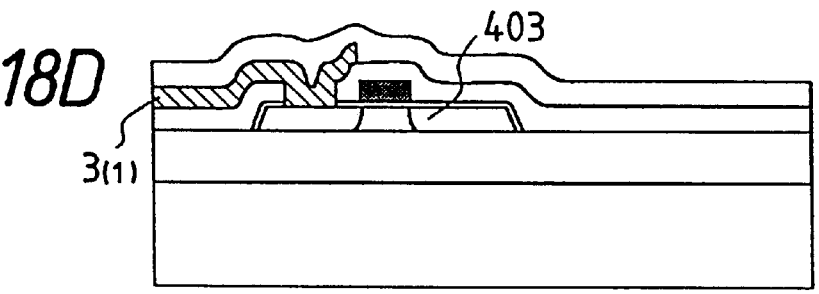
Figure 18E:
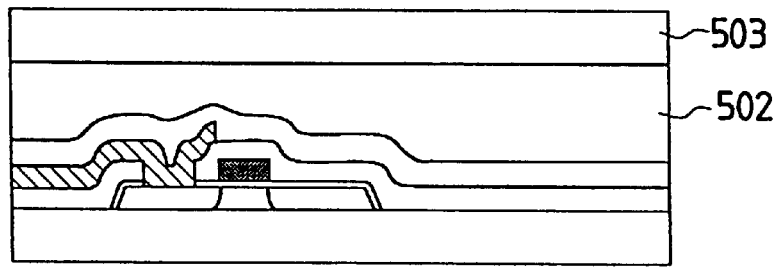
Figure 18F:
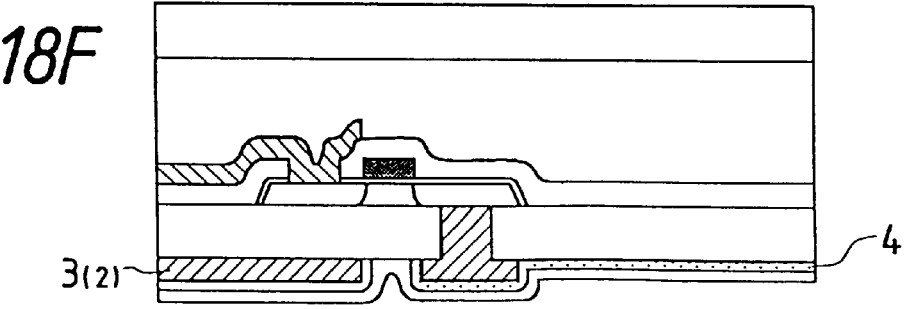

After forming an interlayer insulation layer 405 for shielding, contact holes are bored through the interlayer insulation layer 405 to form a source electrode 403 and a signal line 3(1), on which another interlayer insulation layer 405 is formed for shielding (FIG. 18D). Thereafter, a transparent substrate 503 is bonded to the top by arranging a bonding layer 502 thereunder as shown in FIG. 18E. Meanwhile, the back side of the Si substrate 505 is polished and etched until the insulation film 501 is exposed. Thereafter, a signal line 3(23) and a pixel electrode 4 are formed thereon (FIG. 18F). Since the process of producing filters is same as that of the seventh embodiment, it will not be described here.

While an SOI substrate is used in the above description, a glass substrate may alternatively be used. The subsequent manufacturing steps including bonding, polishing and etching are the same as those described above.

Then, a two-terminal type device such as MIM that operate as a diode is formed as a switching device. A scan signal wiring may be arranged on the opposite electrode.

[Embodiment 9]

Figure 19A:
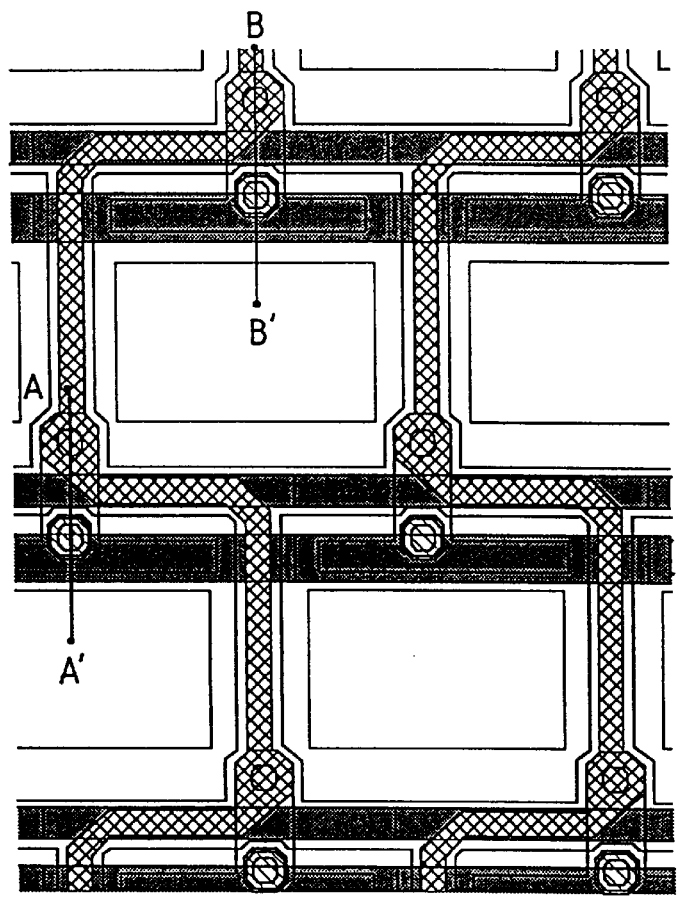
FIGS. 19A to 19C are schematic illustrations of the liquid crystal panel of FIG. 18A to 18F.
Figure 19B:
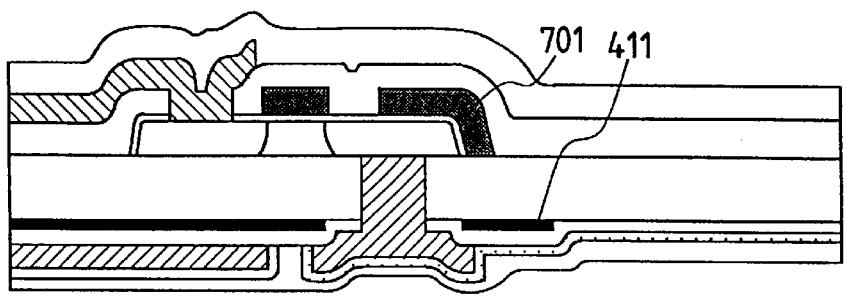
Figure 19C:
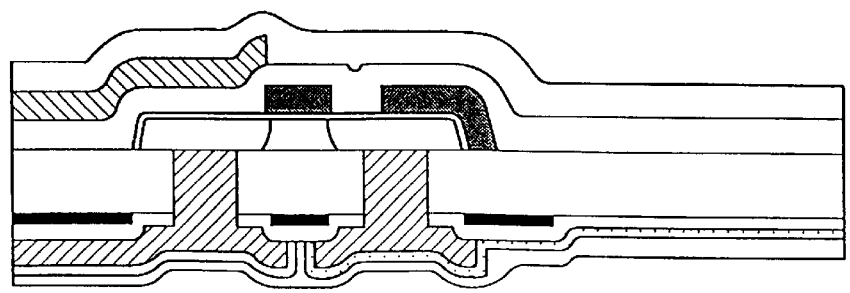
Figure 20:
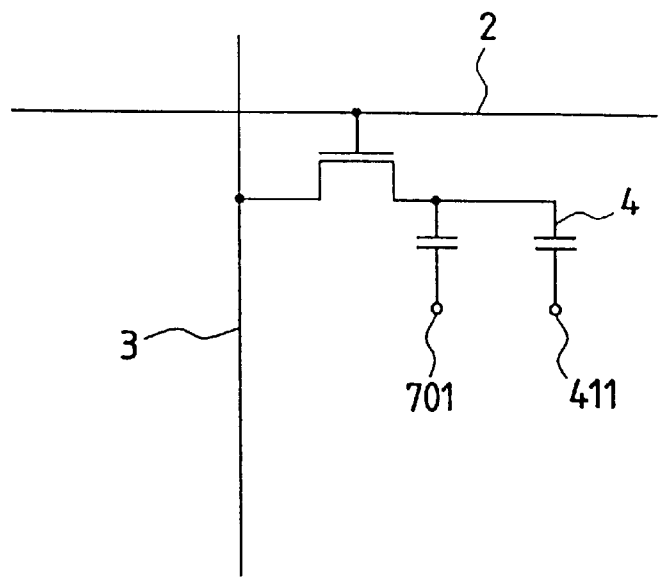
FIG. 20 is a schematic equivalent circuit diagram of a pixel of the liquid crystal panel of FIGS. 19A to 19C.

A ninth embodiment will be described by referring to FIGS. 19A to 19C and 20, of which FIGS. 19A to 19C schematically illustrate part of the embodiment, which is a liquid crystal panel. FIGS. 19B and 19C respectively show the embodiment in partial cross section taken along lines A–A' and B–B'. This embodiment is characterized in that, in addition to the eighth embodiment, a storage capacitance is arranged in parallel with the pixel electrode and a screening layer is formed on the TFT substrate side. In FIGS. 19A to 19C, 701 denotes an electrode prepared by following manufacturing steps same as those for a gate electrode 401. The electrode 401 produces a capacitance between itself and the drain of the TFT, which makes a storage capacitance to be connected in parallel with the pixel electrode 4. A similar capacitance is produced between the screening layer 411 and the pixel electrode 4. FIG. 20 shows an equivalent circuit diagram of the above arrangement.

Generally, a TFT is accompanied by a parasitic capacitance (hereinafter referred to as Cgs) found between the gate and the source. Changes in the gate voltage can shift the potential of the pixel electrode 4 through this capacitance. As the potential of the pixel electrode is shifted, a DC voltage may be applied to the liquid crystal member 408 to give rise to afterglows and burnings in the liquid crystal to damage its reliability. Possible potential shifts in the pixel due to parasitic capacitance Cgs can be minimized by arranging a storage capacitance for each pixel. Deteriorated contrast can take place when the pixel potential is lowered as a result of electric leakage on the part of TFT. This problem can also be avoided by arranging a storage capacitance to increase the electric capacity of the pixel.

Thus, the quality of images displayed on the display screen can be improved with the above embodiment. Since screening layer 411 and the interlayer film arranged between the screening layer 411 and the pixel electrode are as thin as 1,000 Å, they do not adversely affect the stepped surface of an area surrounding the pixel electrode 4.

[Embodiment 10]

Figure 22:
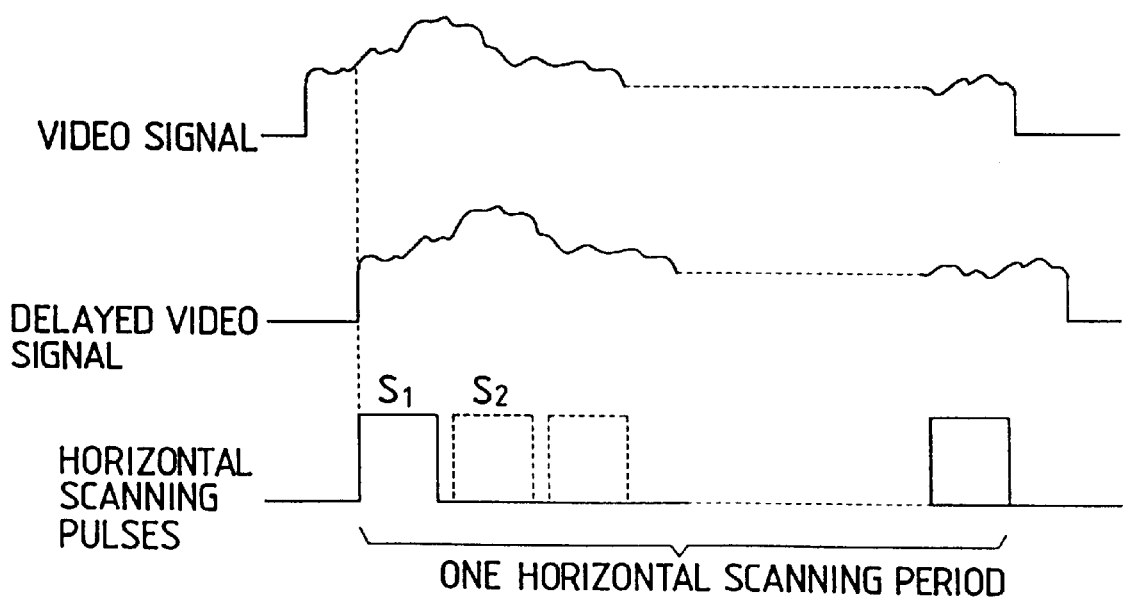
FIG. 22 is an operation timing diagram of the liquid crystal panel of FIG. 21.
Figure 21:
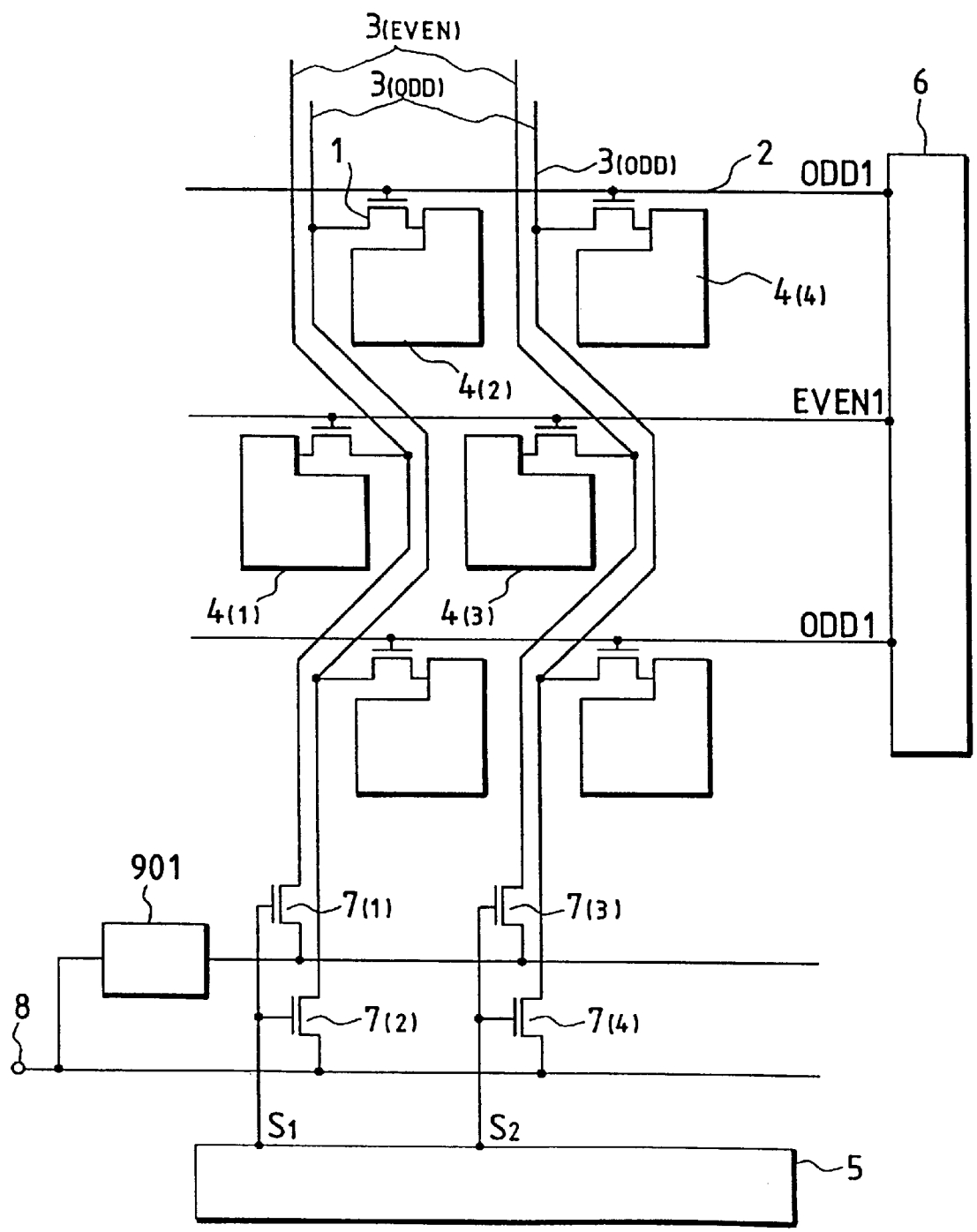
FIG. 21 is a schematic equivalent circuit diagram similar to FIG. 5 but showing still another liquid crystal panel that can be used for the purpose of the invention.

A tenth embodiment of the invention will be described by referring to FIGS. 21 and 22. This embodiment is so designed that, by arranging a delay means 901 for delaying video signals, signals can be written into pixels with timings corresponding to their horizontal spatial positions by using only a pair of horizontal shift registers. FIG. 22 shows a timing chart for this embodiment. The delay means 901 delays each video signal by an amount corresponding to the spatial displacement of the destination pixel. Transfer switches 7(1) and 7(2) are energized by pulse S1 from horizontal shift register 5. Under this condition, a delayed video signal is written into pixel electrode 4(1) after passing through the transfer switch 7(1) and signal line 3(EVEN) and an externally entered video signal is written into pixel electrode 4(2) after passing through the transfer switch 7(2) and signal line 3(EVEN). Thus, by arranging a delay means, a pair of shift registers operate as effectively as two pairs of shift registers of ordinary arrangement so that consequently the entire system can be simplified as the required number of drive pulse is reduced and the manufacturing yield can be improved as the number of shift registers is reduced.

[Embodiment 11]

Figure 23A:
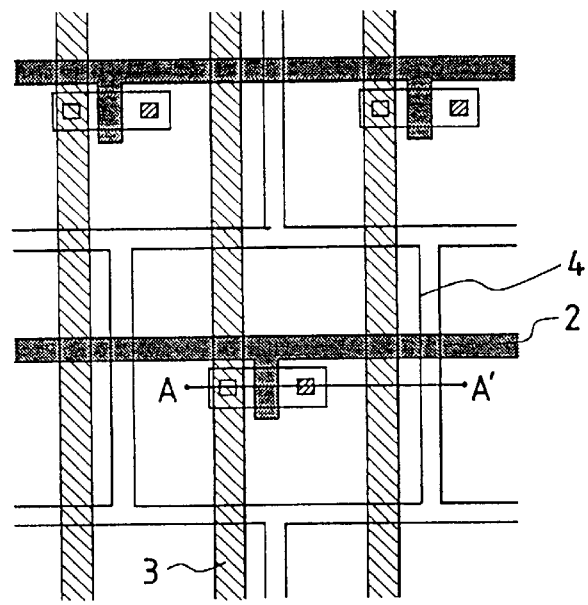
FIGS. 23A to 23D are schematic illustrations of still another liquid crystal panel that can be used for the purpose of the invention.
Figure 23B:
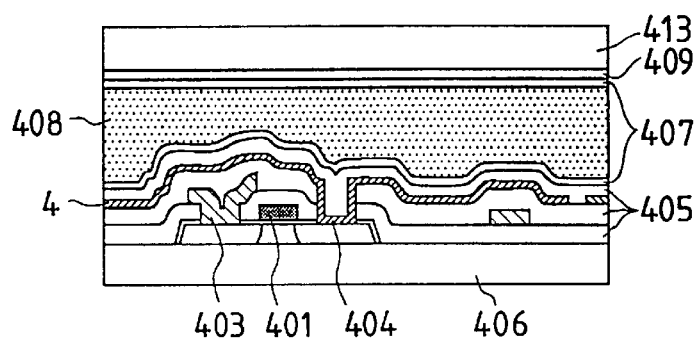
Figure 23C:
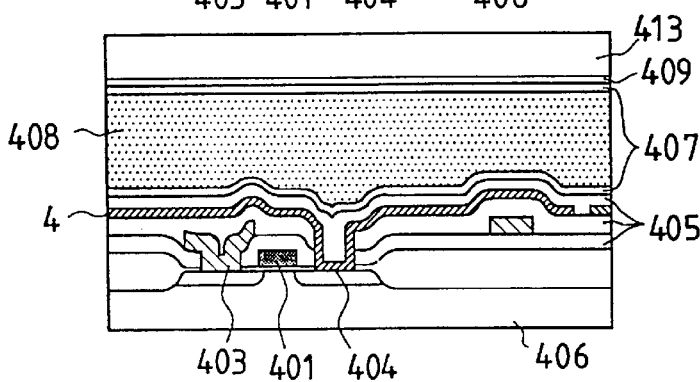

An eleventh embodiment of the invention will now be described by referring to FIGS. 23A to 23D and FIGS. 24A and 24B, of which FIGS. 23A to 23D schematically illustrate part of the embodiment, which is a reflection type liquid crystal panel. FIGS. 23B and 23C respectively show the embodiment in partial cross section taken along lines A–A' and B–B'. Referring to FIGS. 23A to 23D, there are shown a substrate 406 which is a glass or semiconductor substrate, an pixel electrode 4 typically made of aluminum having a high reflection factor and a liquid crystal member 408 made of guest-host type liquid crystal or polymer dispersion type liquid crystal to operate for a reflection type liquid crystal device. A reflection type liquid crystal device is advantageous in that, since the pixel electrode is opaque, a relatively large area can be used for wirings under the pixel electrode so that the aperture ratio of the pixel is not affected by wirings. Thus, in this embodiment, signal lines for connecting with pixels of even rows and those for connecting with pixels of odd rows can be arranged in a same processing step without affecting the aperture ratio of the pixel.

When the substrate is made of a semiconductor material, the pixel TFT can be directly embedded into the substrate as schematically shown by FIG. 23C. If the substrate is a monocrystalline semiconductor substrate, certain peripheral circuits such as shift registers can be realized by using monocrystalline transistors formed directly in the substrate. A monocrystalline transistor shows an enhanced carrier mobility level and hence operates at high speed if compared with a polycrystalline or non-crystalline transistor. Additionally, peripheral circuits can be realized in a single chip and hence a greater number of pixels can be arranged densely on a display screen if monocrystalline transistors are used.

The schematic sectional views of FIGS. 23B and 23C show that the pixel electrode 4 is arranged on an undulated surface, the undulation can be reduced by arranging a leveling film or etching or polishing the surface prior to arranging the electrode for better orientation. No retardation will occur with such an arrangement. The effect of leveling can be further improved when the pixel electrode is formed after embedding a metal such as W on the contact for connecting the pixel electrode and the TFT.

Figure 23D:
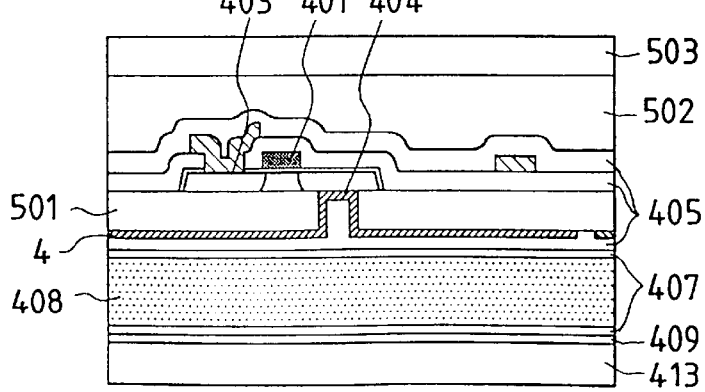

If the reflection type pixel electrode is formed on the surface opposite to the TFT as shown by FIG. 23D, the overall effect of the embodiment is not affected. As described earlier by referring to the second embodiment, no particular levelling operation is required to ameliorate the stepped state of the area surrounding the electrode if the pixel electrode is arranged on the surface opposite to the TFT. Again, the effect of leveling can be further improved when the pixel electrode is formed after embedding a metal such as W on the contact for connecting the pixel electrode and the TFT.

Figure 24A:
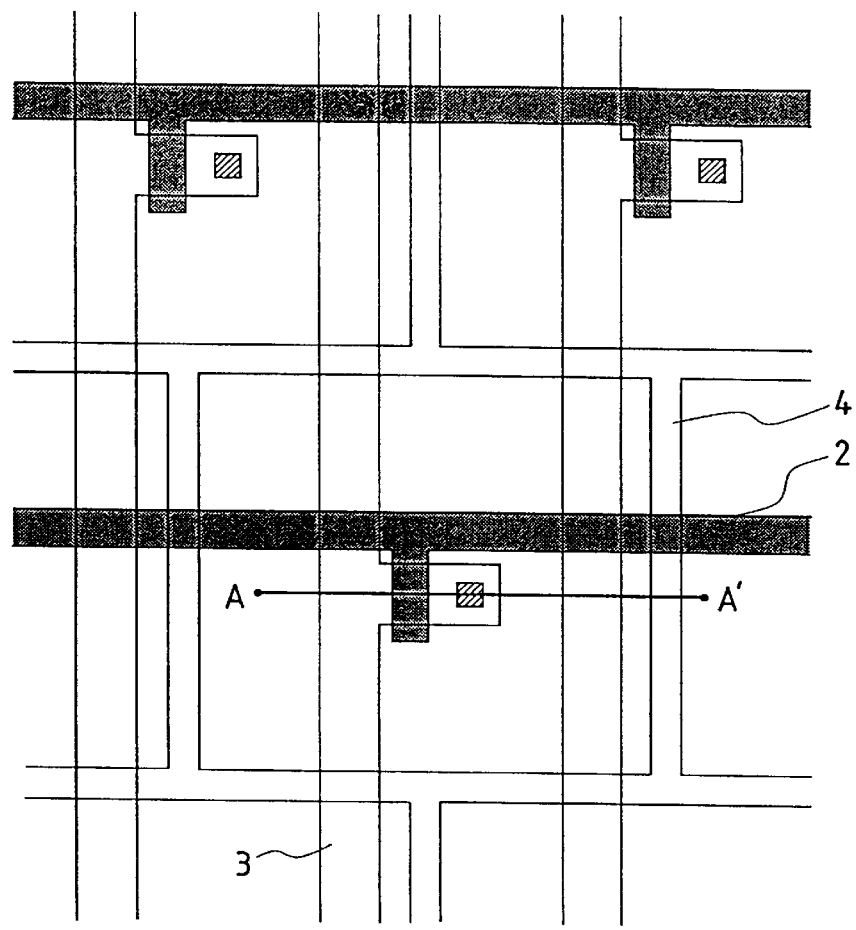
FIGS. 24A to 24B are schematic illustrations of still another liquid crystal panel that can be used for the purpose of the invention.
Figure 24B:
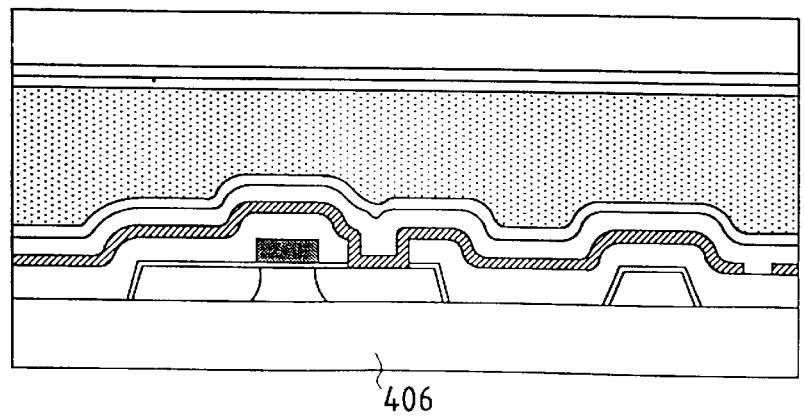

FIGS. 24A and 24B also illustrate a reflection type liquid crystal panel. FIG. 24B shows a schematic cross sectional view of the panel taken along line A–A'. In this embodiment, a semiconductor layer is for signal wirings. More specifically, a semiconductor layer is formed on a transparent substrate 406 of an insulating material and subjected to a patterning operation to produce signal wirings simultaneously with a semiconductor layer that makes a TFT. A metal film of Ta, Ti or W may be formed on the patterned semiconductor layer and thermally processed to produce a silicide of the metal in order to reduce the electric resistance of the wirings. With the illustrated configuration of the liquid crystal panel, the number of processing steps can be reduced while reducing the undulations observed in an area connecting the signal wirings and the TFT in the previous embodiment to realize finely displayed images.

[Embodiment 12]

Figure 25:
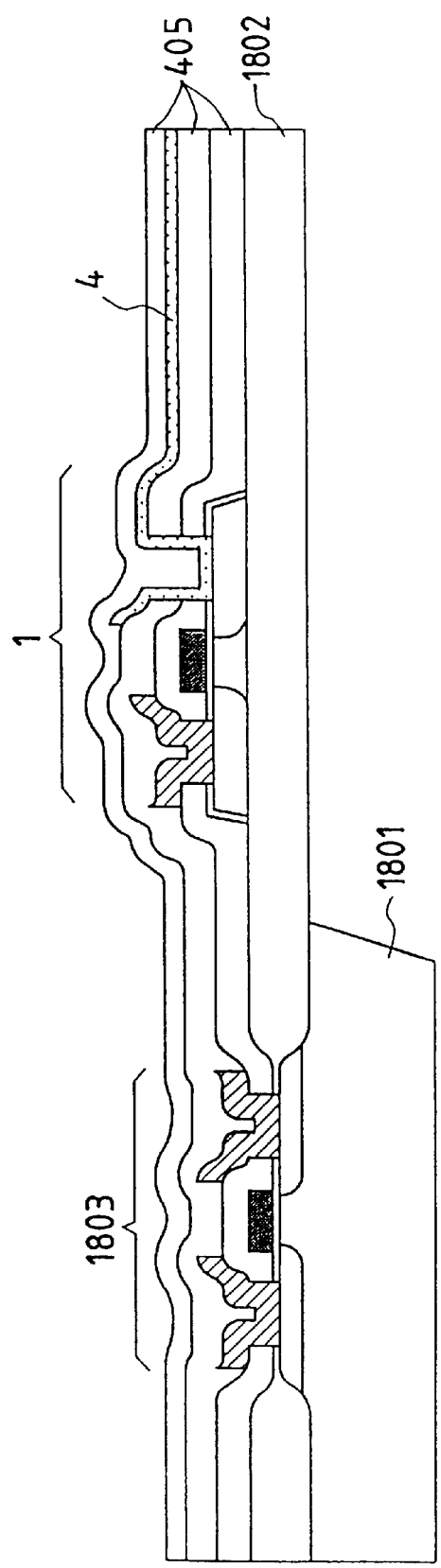
FIG. 25 is a schematic illustration of still another liquid crystal panel that can be used for the purpose of the invention.
Figure 26:
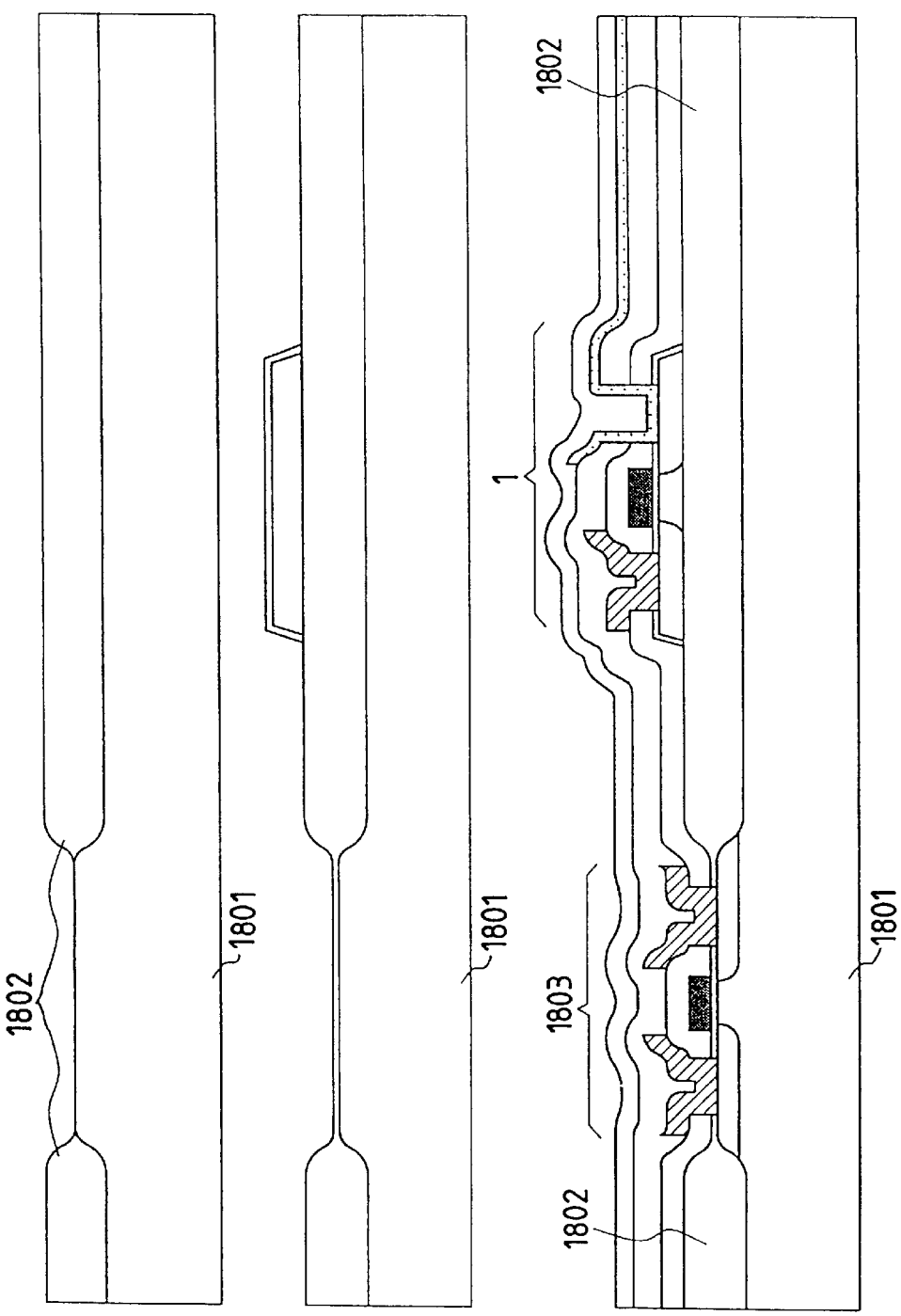
FIGS. 26A to 26C are schematic illustrations showing different steps of manufacturing the liquid crystal panel of FIG. 25.

FIG. 25 is a schematic cross sectional view of the embodiment. This embodiment is a transmissive type liquid crystal display apparatus realized by using a monocrystalline semiconductor substrate for each pixel. Note that the oriented film and the other overlying layers are omitted in FIG. 25 for simplicity. In this embodiment, the shift registers and other peripheral circuits that are required to operate at high speed are formed out of a monocrystalline transistor arranged directly on the semiconductor substrate while the TFT that may be driven at relatively low speed is formed out of an active polycrystalline or non-crystalline layer deposited on the insulation layer. With such an arrangement, peripheral circuits that operate at high speed can be integrally formed into a single chip while using an inexpensive semiconductor substrate to produce a transmissive type liquid crystal display apparatus. For the purpose of this embodiment, peripheral circuits may include level shift circuits for driving TTLs, invertible drivers and buffer memories in addition to shift registers and other ordinary peripheral circuits. Shift registers may be replaced by decoder circuits. Referring to FIG. 25, the embodiment comprises a semiconductor substrate 1801, an insulation layer 1802 formed by selectively oxidizing a semiconductor, a monocrystalline transistor 1803 and a pixel TFT 1 formed on the insulation layer 1802. FIGS. 26A to 26C show different steps of manufacturing the embodiment.

While a TFT is directly formed on the insulation layer 1802 in FIG. 25, it will be understood that a TFT may alternatively be formed on a Lp-SiN film that is prepared on the insulation layer 1802 and oxidized. With this alternative arrangement, the insulation film becomes more resistive against stress and tension when the Si substrate is bored through at the pixel section to ensure an improved performance for displaying images.

Referring to FIGS. 26A to 26C, for manufacturing this embodiment, an insulation region and a semiconductor region are formed by selectively oxidizing a semiconductor substrate (FIG. 26A). After forming an insulation film as a shield, a polycrystalline or non-crystalline semiconductor layer is formed by deposition and subjected to a patterning operation. Then, the insulation shield layer is peeled off and a gate oxide film is formed through oxidation (FIG. 26B). Thereafter, a monocrystalline transistor 1803 and a pixel TFT 1 are formed by forming gate electrodes, source/drain diffusion layers and extraction wirings other components for them (FIG. 26C). Finally, a transmissive type display apparatus is realized by removing the semiconductor substrate in the pixel region by means of polishing, etching or some other appropriate technique (FIG. 25).

In the embodiment again, a stepped area surrounding the pixel electrode is ameliorated in terms of undulation by removing the semiconductor substrate in the pixel region and forming a transparent and/or highly reflective pixel electrode on the surface of the substrate opposite to the TFT. Additionally, peripheral circuits are integrally formed in a single chip to allow high speed operations in a transmissive or reflection type display apparatus.

[Embodiment 13]

Figure 27:
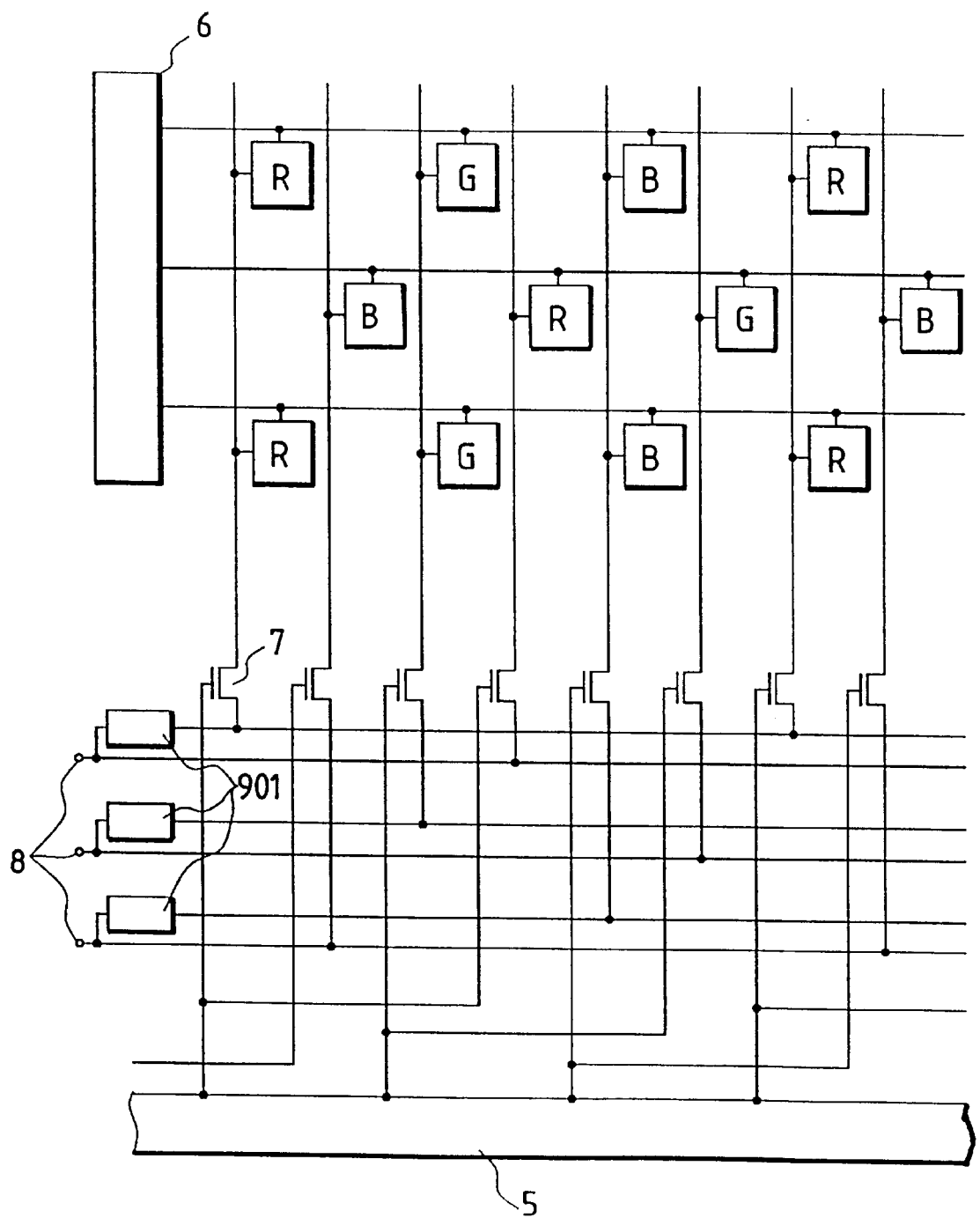
FIG. 27 is a schematic equivalent circuit diagram of still another liquid crystal panel that can be used for the purpose of the invention.

FIG. 27 shows a thirteenth embodiment of the invention, which is a color display panel. By arranging a delay means 901 for delaying video signals for each of the three colors of red (R), green (G) and blue (B), the display panel can be effectively driven to operate by seven pairs of horizontal shift registers as in the case of Embodiment 8.

What is claimed is:

1. A display apparatus comprising:

a plurality of display systems, each comprising a light source, a reflection type liquid crystal panel and an optical system, said plurality of display systems including a black-monochromatic system, a red-monochromatic system, a green-monochromatic system and a blue-monochromatic system;

display means for displaying superimposingly a plurality of images obtained through said plurality of display systems;

means for selecting at least one display system for displaying at least one of a black-monochromatic display, a black-monocolor mixture display, a full color display, and a black-full color mixture display;

switching means for switching the selection of said plurality of display systems according to a selection by said selecting means;

an interface to at least one information terminal; and an image processing circuit for controlling said plurality of display systems, such that said plurality of display systems conduct the black-monochromatic display, the full color display, the black-monocolor display, or the black-full color mixture display.

2. A display apparatus according to claim 1, wherein said liquid crystal panel is illuminated by light from said light source only in the vicinity of monochromatic and color display regions.

3. A display apparatus according to claim 1, wherein a monochromatic signal having a black signal in a color displaying region, and a color signal having a black signal in a monochromatic displaying region are produced.

4. A display apparatus according to claim 1, wherein said optical system includes a schlieren optical system.

5. A display apparatus according to claim 1, further comprising a mirror and a pinhole arranged on a focal point of a lens disposed on said liquid crystal panel.

6. A display apparatus according to claim 1, wherein said liquid crystal panel is a polymer type.

7. A display apparatus according to claim 1, further comprising an anti-reflection film disposed on a front surface of a transparent substrate, on which an illumination light from said light source toward a liquid crystal panel is incident, and on a rear surface of said transparent substrate opposite to said front surface.

* * * * *

UNITED STATES PATENT AND TRADEMARK OFFICE
CERTIFICATE OF CORRECTION

| | | |
|---|---|---|
| PATENT NO. | : 6,747,613 B2 | |
| APPLICATION NO. | : 09/777669 | |
| DATED | : June 8, 2004 | |
| INVENTOR(S) | : Mamoru Miyawaki et al. | |

It is certified that error appears in the above-identified patent and that said Letters Patent is hereby corrected as shown below:

Title page,
Item [30], Foreign Application Priority Data, "Mar. 16, 1994" should read
-- Mar. 15, 1994 --.

Column 14,
Line 41, delete "can" (first occurrence).

Column 15,
Line 18, "the focused" should read -- then focused --.

Signed and Sealed this

Fourth Day of July, 2006

JON W. DUDAS
*Director of the United States Patent and Trademark Office*